(12) United States Patent
Isozaki et al.

(10) Patent No.: US 7,757,087 B2
(45) Date of Patent: Jul. 13, 2010

(54) INFORMATION PROCESSING APPARATUS AND INFORMATION PROCESSING METHOD

(75) Inventors: Hiroshi Isozaki, Kanagawa-ken (JP); Taku Kato, Kanagawa-ken (JP); Takashi Kokubo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1088 days.

(21) Appl. No.: 11/085,531

(22) Filed: Mar. 22, 2005

(65) Prior Publication Data
US 2006/0085644 A1    Apr. 20, 2006

(30) Foreign Application Priority Data
Oct. 15, 2004  (JP)  ............... 2004-301888

(51) Int. Cl.
*H04L 9/32* (2006.01)
*H04N 7/167* (2006.01)
*H04L 9/00* (2006.01)

(52) U.S. Cl. ............ 713/171; 713/168; 713/181; 380/232; 380/262

(58) Field of Classification Search ........ 380/232, 380/262; 705/67; 713/168, 171, 181
See application file for complete search history.

(56) References Cited

U.S. PATENT DOCUMENTS

| | | | |
|---|---|---|---|
| 6,055,314 A * | 4/2000 | Spies et al. | 380/228 |
| 6,834,111 B1 * | 12/2004 | Nishimura et al. | 380/255 |
| 6,983,371 B1 * | 1/2006 | Hurtado et al. | 713/189 |
| 2002/0048372 A1 * | 4/2002 | Toh et al. | 380/285 |
| 2003/0026433 A1 * | 2/2003 | Matt | 380/278 |
| 2003/0046565 A1 | 3/2003 | Morino | |
| 2003/0126445 A1 * | 7/2003 | Wehrenberg | 713/176 |
| 2003/0126458 A1 * | 7/2003 | Teramoto et al. | 713/194 |
| 2004/0107343 A1 | 6/2004 | Kokubo | |
| 2004/0174874 A1 * | 9/2004 | Saito et al. | 370/389 |
| 2005/0060547 A1 * | 3/2005 | Saito et al. | 713/171 |

(Continued)

FOREIGN PATENT DOCUMENTS

EP        1 182 825 A2    2/2002

(Continued)

OTHER PUBLICATIONS

U.S. Appl. No. 11/130,135, filed May 17, 2005, Isozaki et al.

*Primary Examiner*—William R Korzuch
*Assistant Examiner*—Sarah Su
(74) *Attorney, Agent, or Firm*—Oblon, Spivak, McClelland, Maier & Neustadt, L.L.P.

(57) ABSTRACT

An information processing apparatus has an authentication & key exchange unit, a contents receiver, a contents decryption unit and a contents confirmation request unit. The authentication & key exchange unit performs authentication & key exchange processing by using a given protocol with the communication apparatus and generates a first key shared with the communication apparatus. The contents receiver receives encrypted contents obtained by encrypting the contents with a second key generated by using the first key and the key information, and the key information attached to the encrypted contents. The contents decryption unit decrypts the encrypted contents by using the first key and the key information. The contents confirmation request unit instructs the communication apparatus to transmit or confirm the key information held by the communication apparatus, when the contents decryption unit decrypts the contents based on the second key firstly generated by using the first key.

31 Claims, 16 Drawing Sheets

U.S. PATENT DOCUMENTS

2005/0076210 A1 * 4/2005 Thomas et al. ............... 713/165
2006/0265735 A1 * 11/2006 Ohno ............................ 726/2
2007/0098177 A1 * 5/2007 Asano et al. ................ 380/279

FOREIGN PATENT DOCUMENTS

| | | |
|---|---|---|
| EP | 1182825 A2 * | 2/2002 |
| GB | 2 384 402 A | 7/2003 |
| JP | 2000-287192 | 10/2000 |
| JP | 2003-143128 | 5/2003 |
| JP | 2003-283489 | 10/2003 |
| JP | 2004-48458 | 2/2004 |
| JP | 2004-128670 | 4/2004 |

* cited by examiner

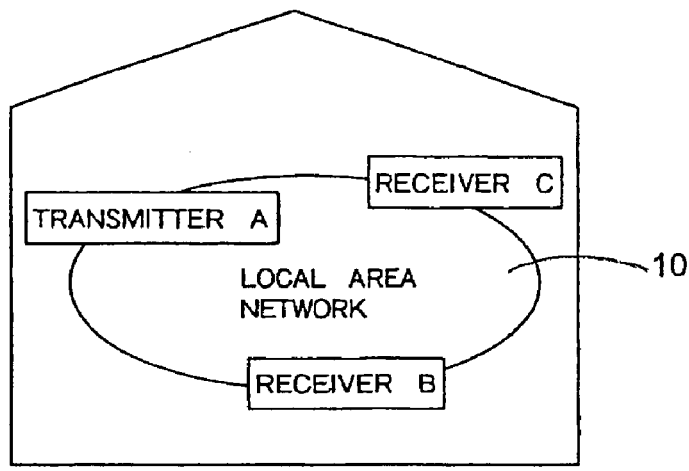
F I G. 1
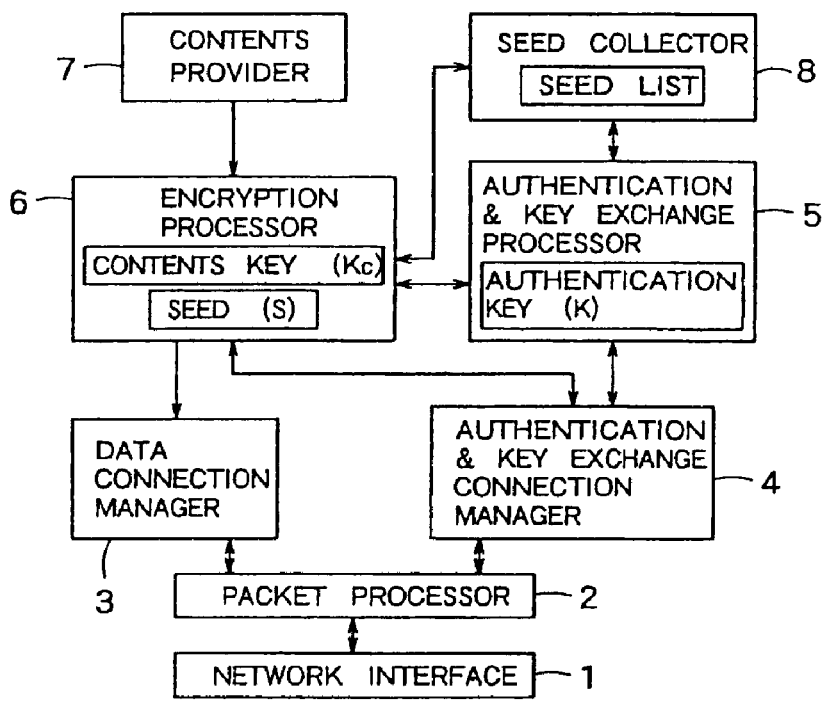
F I G. 2

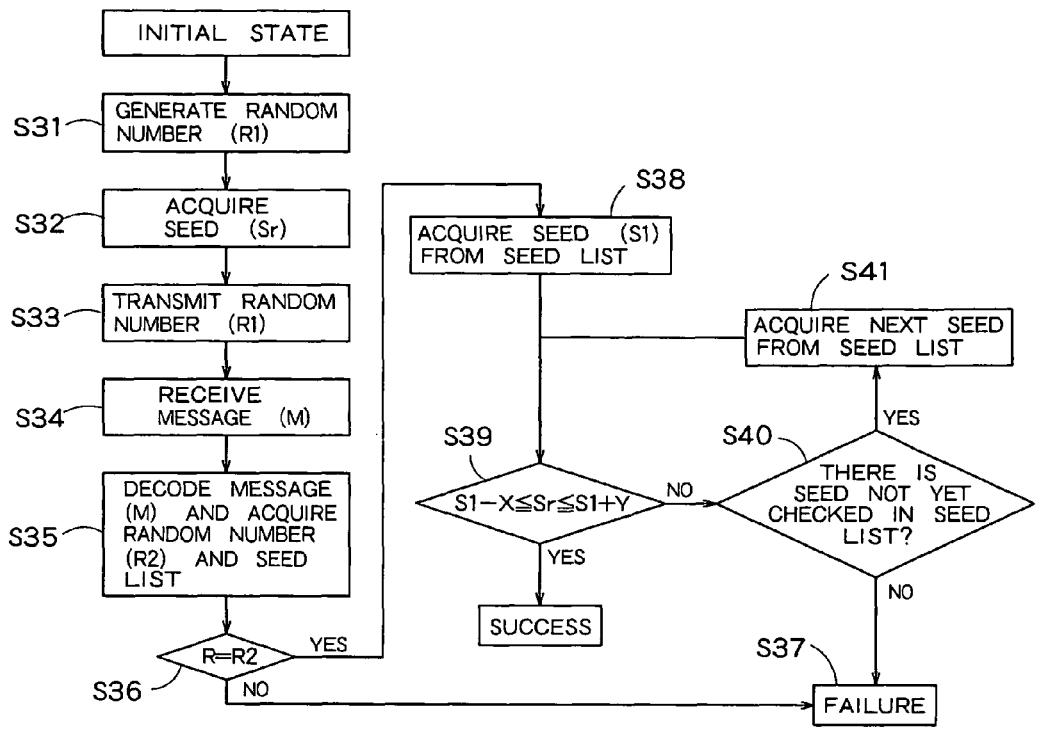
F I G. 6
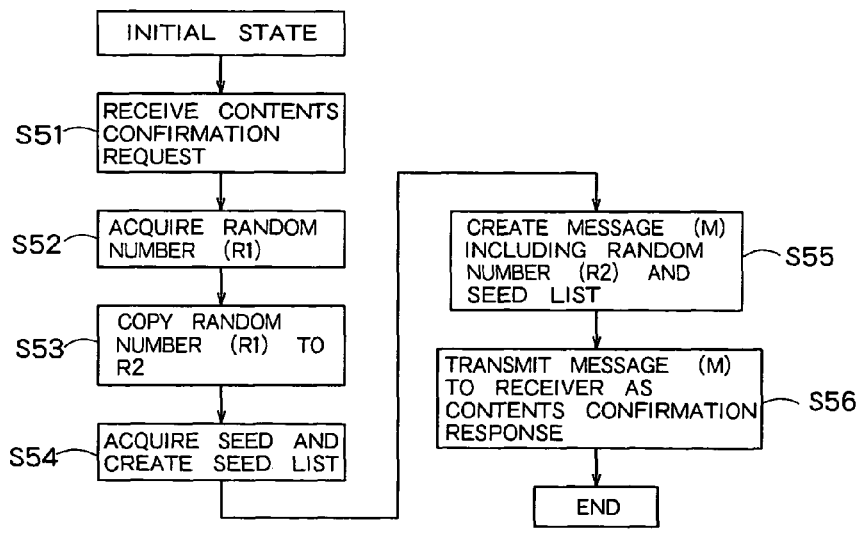
F I G. 7

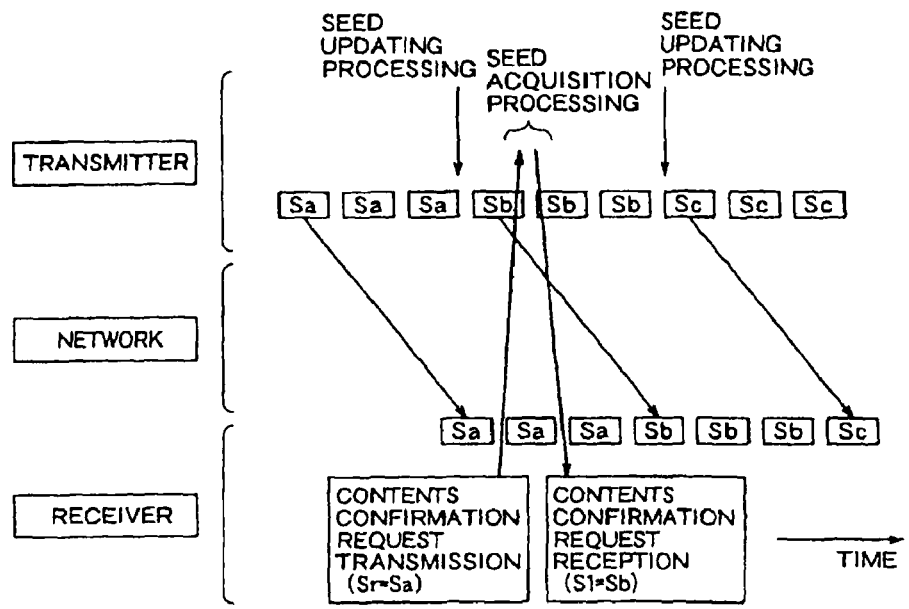
F I G. 10
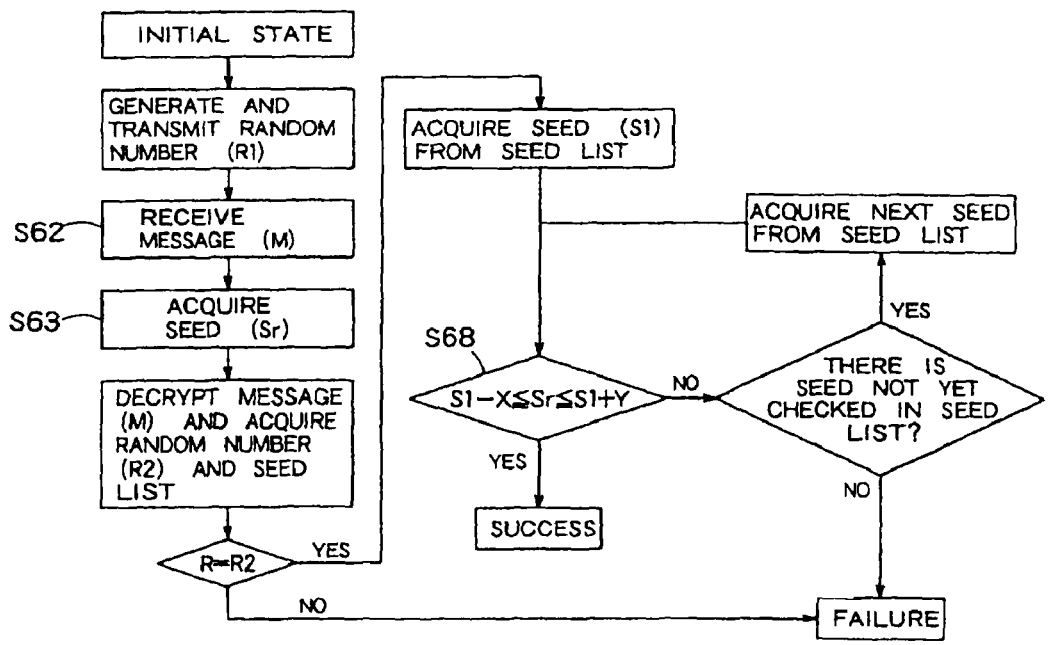
F I G. 11

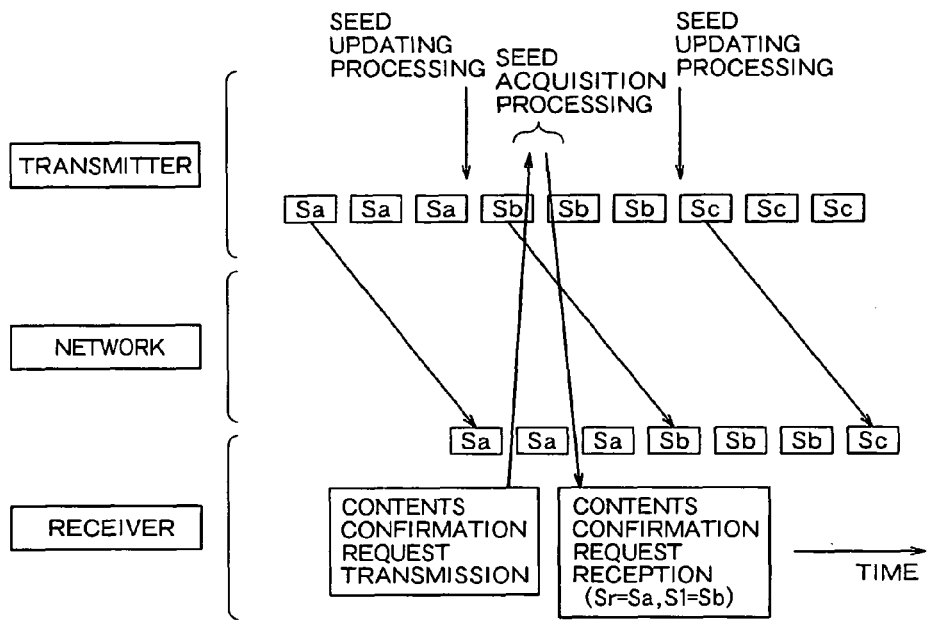
F I G. 12
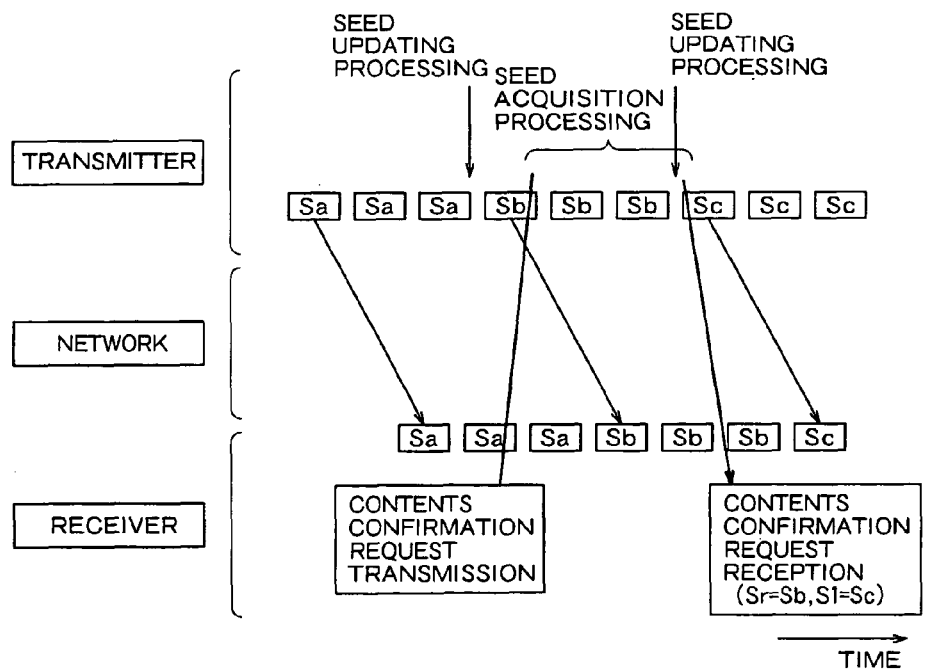
F I G. 13

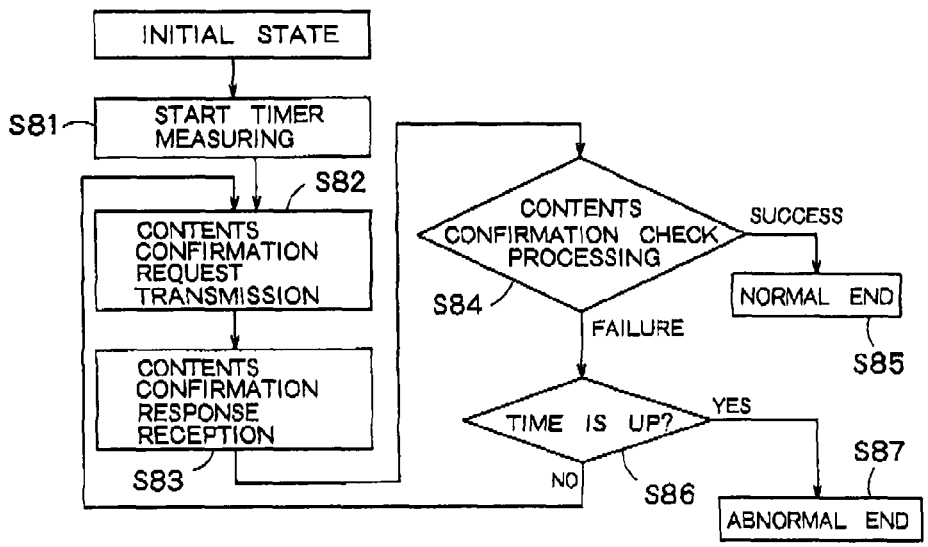
F I G. 14
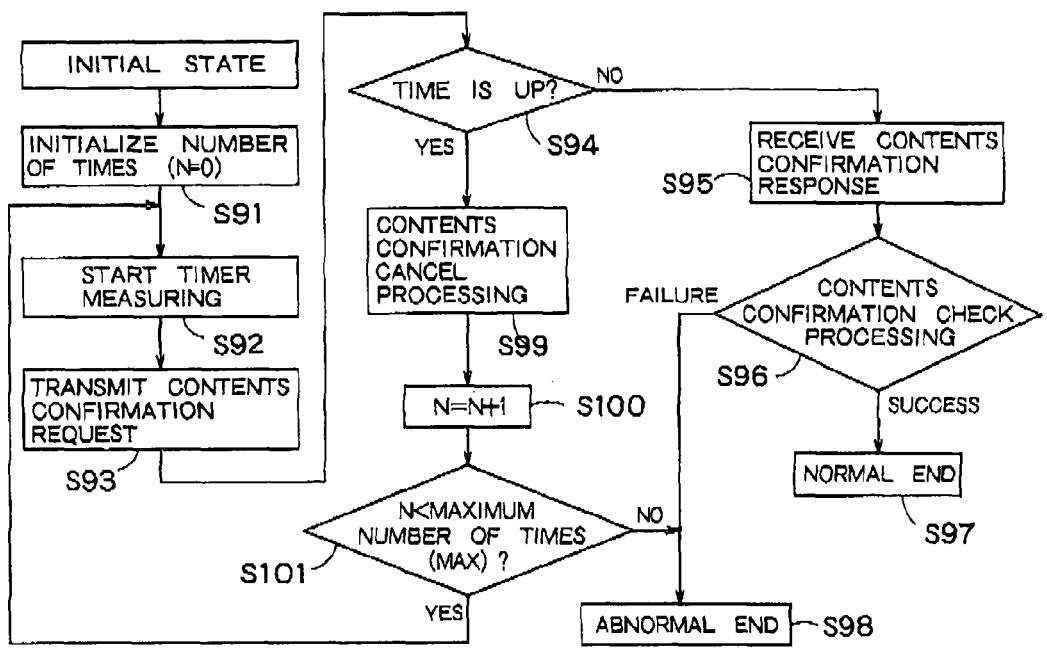
F I G. 15

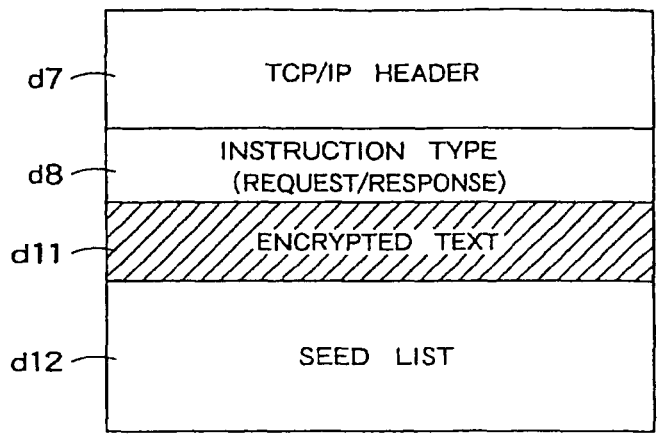
F I G. 16
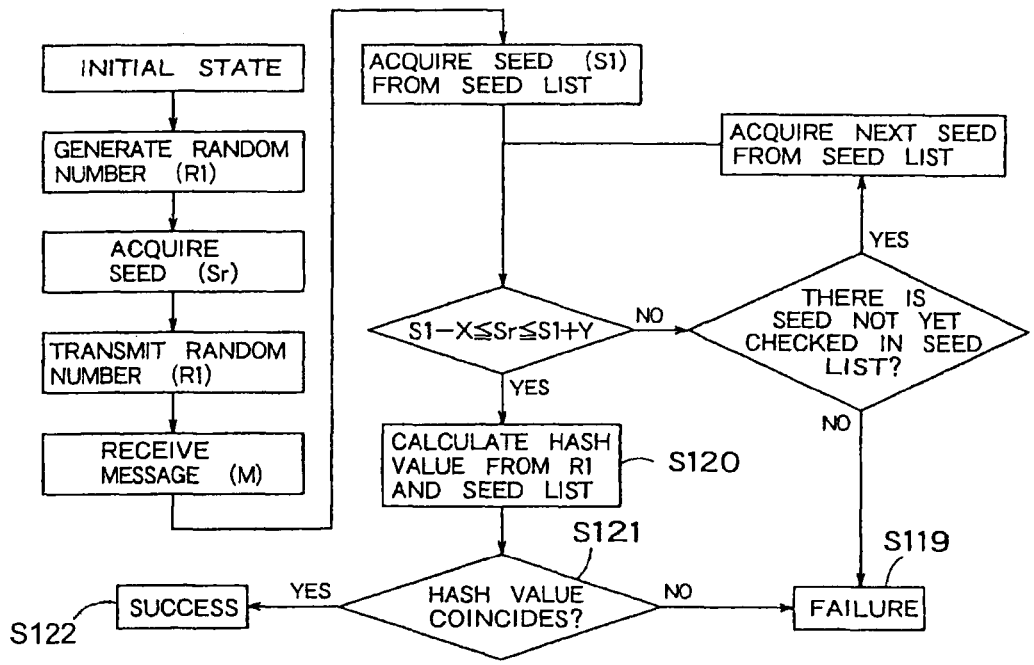
F I G. 17

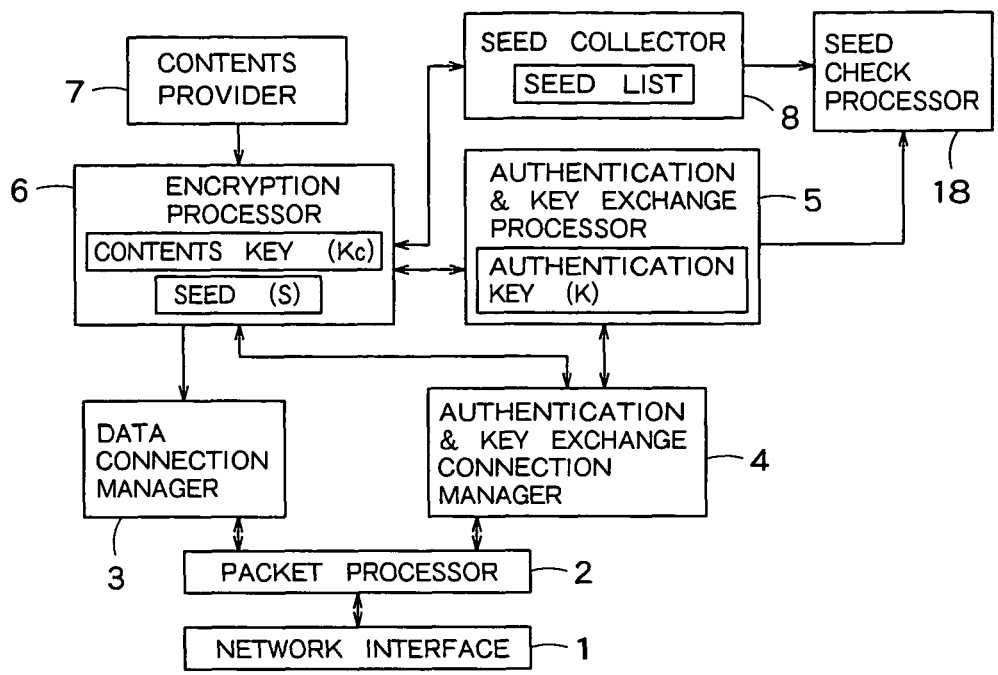
F I G. 18
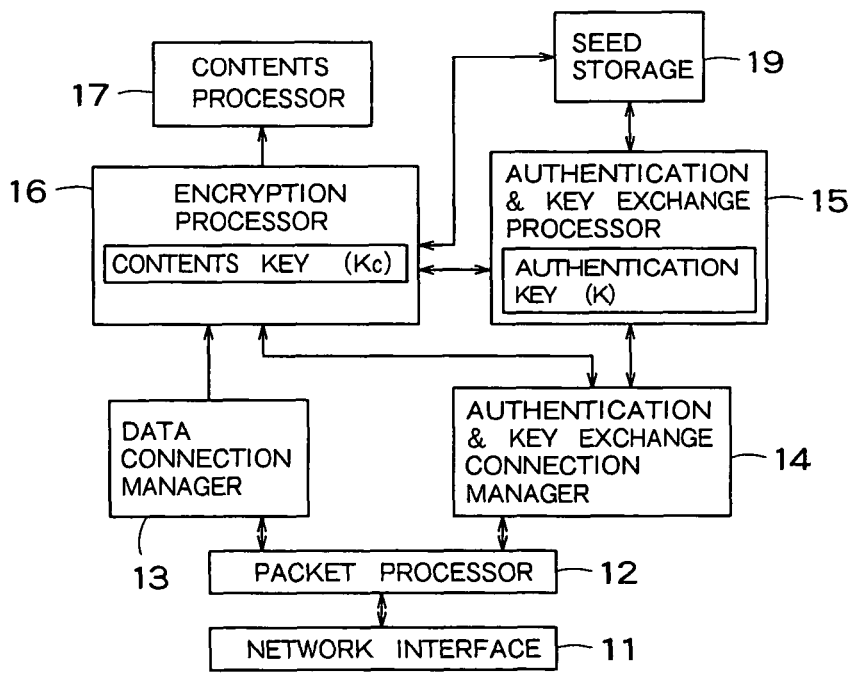
F I G. 19

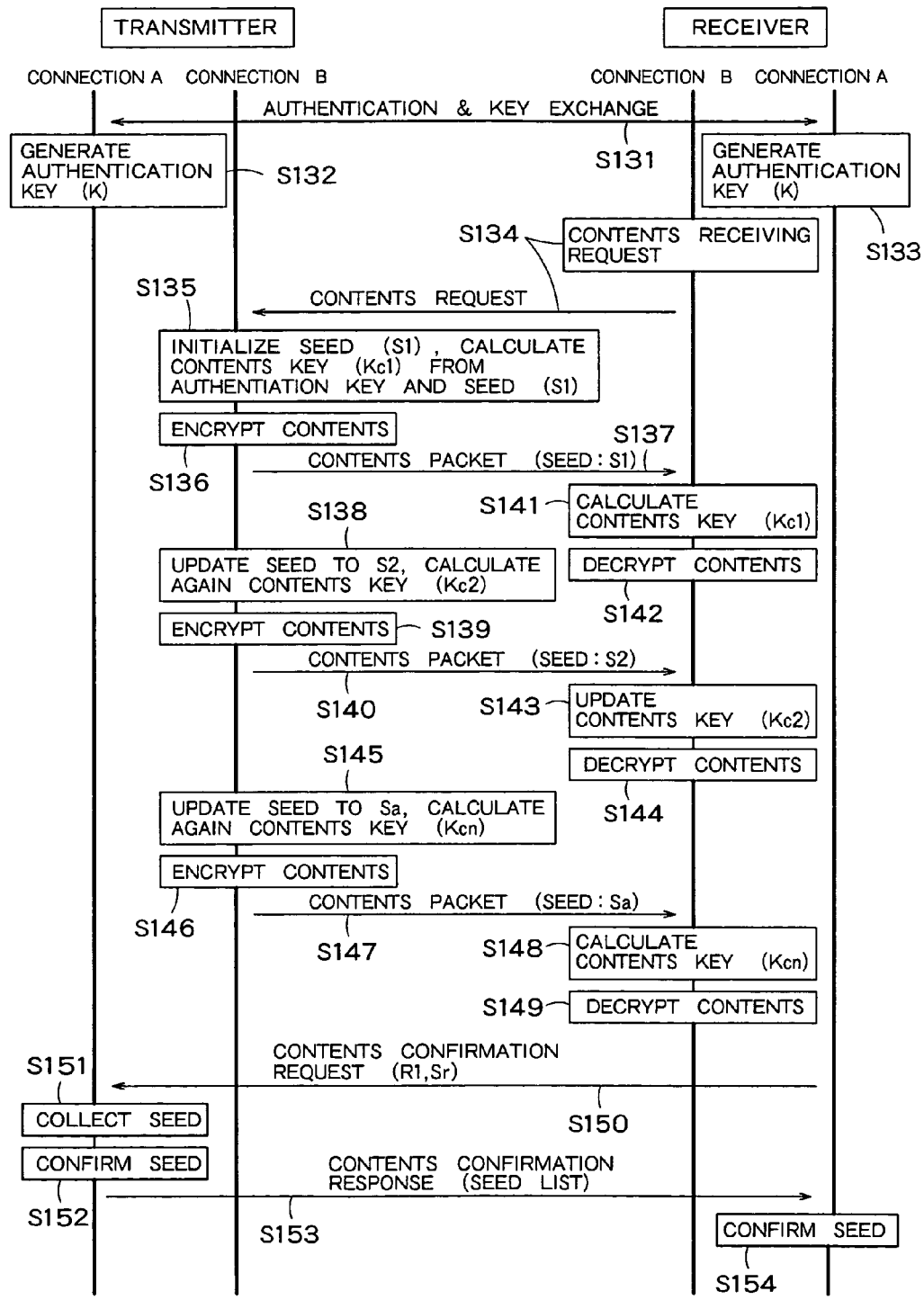
F I G. 20

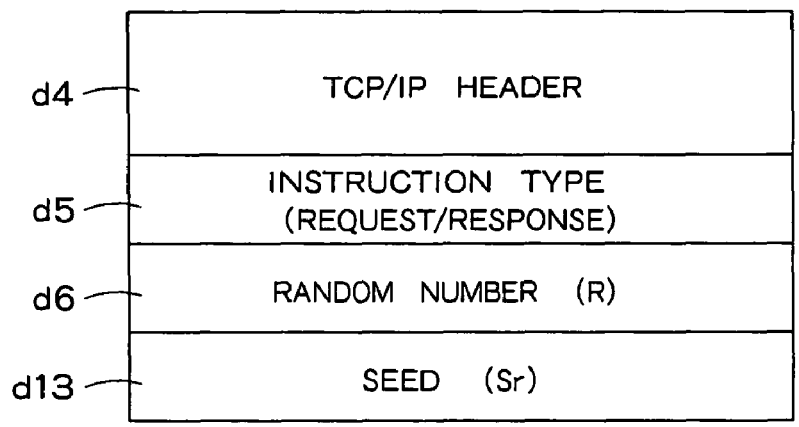
F I G. 23
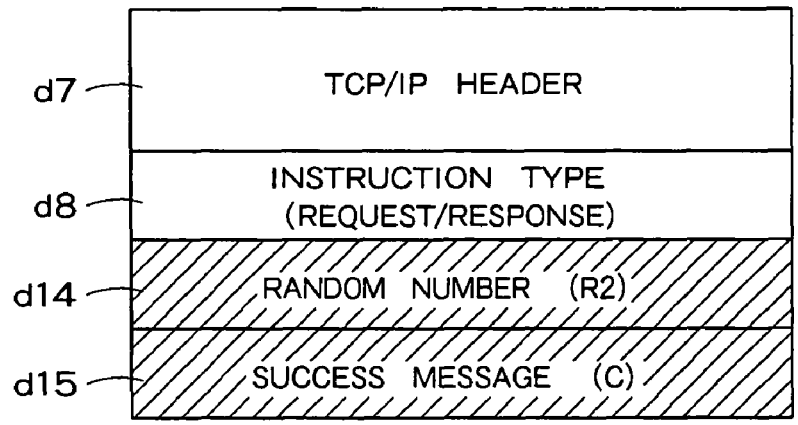
F I G. 24

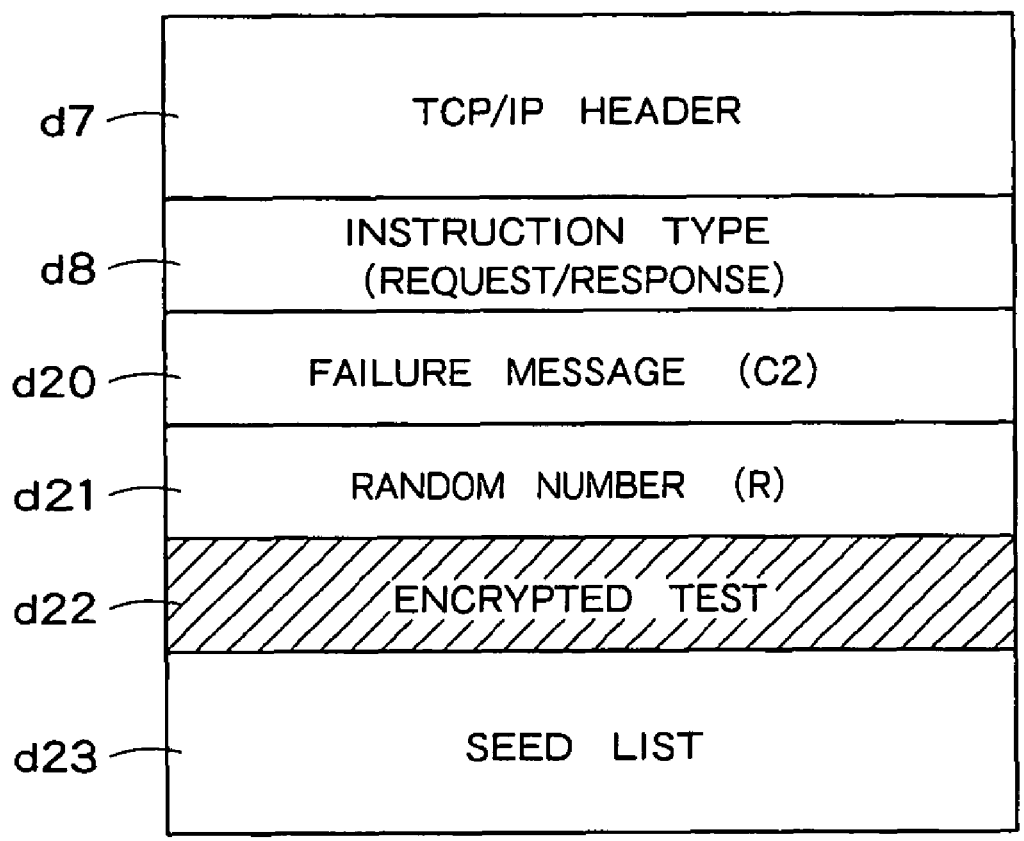
F I G. 29

INFORMATION PROCESSING APPARATUS AND INFORMATION PROCESSING METHOD

CROSS REFERENCE TO RELATED APPLICATIONS

This application is based upon and claims the benefit of priority from the prior Japanese Patent Application No. 2004-301888, filed on Oct. 15, 2004, the entire contents of which are incorporated herein by reference.

BACKGROUND OF THE INVENTION

1. Field of the Invention

The present invention relates to an information processing apparatus that receives or transmits contents requiring copyright protections.

2. Related Art

Along with the diffusion of computer networks and digitalization in recent years, products called digital information home appliances are widespread. Furthermore, with the starting of digital broadcasting, digital TV, set-top boxes and DVD recorders for digital broadcasting are expected to be more widely spread from now on. When these digital information home appliances are connected to a home network, users can enjoy the contents via the network, and this is beneficial for users.

The contents refer to various kinds of digital data, for example, audiovisual data such as MPEG2 or MPEG4, audio data, document data such as text data and still image data. The contents of this kind of digital data have an advantage in that the data can be easily copied without degradation. On the other hand, there is a problem that users must pay attention to the copyright of the contents. We assume a case of transmitting copyright-protected contents from a certain transmitter to a receiver. It is desirable that exchanges of copyright-protected contents are limited to within a certain range. For example, the contents are exchanged within a range of a legitimate right, such as within a range of private utilization as prescribed in the copyright law, or within a narrower range than the range prescribed by the law. Exchanges of the contents with a third party outside this range should be prohibited.

However, a transmission of audio and audiovisual data via a network has a risk of infringement on the copyright law. For example, in the case of transmitting copy-prohibited contents from a transmitter to a receiver, the data can be illegally copied with a device connected to the network, unless the transmitted contents are encrypted. Upon transferring the audio and audiovisual data by using the interne protocol (IP), a general technique of filtering and monitoring the data on the network is used. The use of this technique makes it possible for a user to filter and obtain arbitrary data transferred between a specific transmitter and a receiver. In other words, the user can efficiently collect only the contents excluding control information out of the data transmitted from the transmitter to the receiver.

Considering the user's convenience, it is important to provide a system in which the receiver can securely receive the desirable contents from transmitter. For example, according to the IP, if there is a device called a proxy server between a transmitter and a receiver, the following problems may occur. The proxy server blocks a request for contents transmitted from the receiver, just before the transmitter. The proxy server sends, on behalf of the receiver, a request for contents that are different from the contents requested by the receiver, to the transmitter. Furthermore, the proxy server sends a request for contents that are different from the contents requested by the receiver, to a different transmitter. In this way, the proxy server enables a receiver to receive contents that are different from the contents originally requested by the receiver.

SUMMARY OF THE INVENTION

The present invention has been achieved in the light of the above problems. It is an object of the present invention to provide an information processing apparatus and an information processing method that make it possible to effectively utilize contents, by securely preventing an unfair utilization of the contents and by enabling users to correctly receive desired contents.

According to one embodiment of the present invention, an information processing apparatus which receives encrypted contents and key information attached to the contents transmitted from a communication apparatus connected via a network, comprising:

authentication & key exchange unit which performs authentication & key exchange processing by using a given protocol with the communication apparatus and generates a first key shared with the communication apparatus;

a contents receiver which receives encrypted contents obtained by encrypting the contents with a second key generated by using the first key and the key information, and the key information attached to the encrypted contents;

a contents decryption unit which decrypts the encrypted contents by using the first key and the key information; and a contents confirmation request unit configured to instruct the communication apparatus to transmit or confirm the key information held by the communication apparatus, when the contents decryption unit decrypts the contents based on the second key firstly generated by using the first key.

Furthermore, according to one embodiment of the present invention, an information processing apparatus which receives encrypted contents and key information attached to the contents transmitted from a communication apparatus connected via a network, comprising:

authentication & key exchange unit which performs authentication & key exchange processing by using a given protocol with the communication apparatus and generates a first key shared with the communication apparatus;

a contents receiver which receives encrypted contents obtained by encrypting the contents with a second key generated by using the first key and the key information, and the key information attached to the encrypted contents;

a contents decryption unit which decrypts the encrypted contents by using the first key and the key information; and a contents confirmation request unit configured to instruct the communication apparatus to transmit or confirm the key information held by the communication apparatus, when the key information transmitted from the communication apparatus does not change in order agreed with the communication apparatus in advance.

Furthermore, according to one embodiment of the present invention, an information processing apparatus which receives encrypted contents and key information attached to the contents transmitted from a communication apparatus connected via a network, comprising:

authentication & key exchange unit which performs authentication & key exchange processing by using a given protocol with the communication apparatus and generates a first key shared with the communication apparatus;

a contents receiver which receives encrypted contents obtained by encrypting the contents with a second key generated by using the first key and the key information and the key information attached to the encrypted contents;

a contents decryption unit which decrypts the encrypted contents by using the first key and the key information; and a contents confirmation request unit configured to instruct the communication apparatus to transmit or confirm the key information held by the communication apparatus, when the key information transmitted from the communication apparatus does not change in order agreed with the communication apparatus in advance.

Furthermore, according to one embodiment of the present invention, an information processing apparatus which receives encrypted contents and key information attached to the contents transmitted from a communication apparatus connected via a network, comprising:

authentication & key exchange unit which performs authentication & key exchange processing by using a given protocol with the communication apparatus and generates a first key shared with the communication apparatus;

a contents receiver which receives encrypted contents obtained by encrypting the contents with a second key generated by using the first key and the key information, and the key information attached to the encrypted contents;

a contents decryption unit which decrypts the encrypted contents by using the first key and the key information; and a contents confirmation request unit configured to instruct the communication apparatus to transmit or confirm the key information held by the communication apparatus, when a connection for contents transmission with the communication apparatus is once cut off and the connection with the communication apparatus is again established to begin the contents transmission.

Furthermore, according to one embodiment of the present invention, an information processing apparatus which transmits encrypted contents to a communication apparatus connected via a network, comprising:

an authentication & key exchange unit configured to perform authentication & key exchange processing by using a given protocol with the communication apparatus;

a key generation unit configured to operate a given function by using the key information including a random number and the first key to generate a second key;

an encryption unit configured to encrypt contents by using the second key;

a contents transmitter which transmits the encrypted contents with the key information in plain text, to the communication apparatus;

a key information updating unit configured to update the key information based on a given condition;

a random number acquisition unit configured to acquire the random number included in a contents confirmation request transmitted from the communication apparatus;

a key information acquisition unit which acquires the key information being currently used to encrypt the contents; and a contents confirmation response unit configured to transmit a message including the key information acquired by the key information acquisition unit and the random number acquired by the random number acquisition unit to the communication apparatus, as a contents confirmation response for the contents confirmation request.

BRIEF DESCRIPTION OF THE DRAWINGS

FIG. 1 is a block diagram showing a schematic configuration of a contents transmitting and receiving system having an information processing apparatus according to a first embodiment of the present invention.

FIG. 2 is a block diagram showing a schematic configuration of the transmitter A according to the present embodiment.

FIG. 6 is a flowchart showing one example of a detailed processing procedure of the contents confirmation processing that the receiver B carries out.

FIG. 7 is a flowchart showing one example of a detailed processing procedure of the contents confirmation processing that the transmitter A carries out.

FIG. 10 is a diagram showing a seed update timing of the transmitter A and a seed update timing of the receiver B.

FIG. 11 is a flowchart showing a processing procedure of the receiver B according to a modification of the process shown in FIG. 6.

FIG. 12 is a graph showing a seed update timing of the transmitter A and a seed update timing of the receiver B.

FIG. 13 is a sequence diagram showing an example different from that shown in FIG. 12.

FIG. 14 is a flowchart showing one example of a time limit processing of the contents confirmation response that the receiver B carries out.

FIG. 15 is a flowchart showing a modification of the processing shown in FIG. 14.

FIG. 16 is a diagram showing one example of a format of the contents confirmation response message including the message M2 transmitted from the transmitter A.

FIG. 17 is a flowchart showing a processing procedure of the receiver B according to the second embodiment.

FIG. 18 is a block diagram showing a schematic configuration of the transmitter A according to the third embodiment.

FIG. 19 is a block diagram showing a schematic configuration of the receiver B according to the third embodiment.

FIG. 20 is a sequence diagram showing one example of a processing procedure that is carried out between the transmitter A shown in FIG. 18 and the receiver shown in FIG. 19.

FIG. 23 is a diagram showing one example of a message format of the contents confirmation request.

FIG. 24 is a diagram showing one example of a message format of the contents confirmation response.

FIG. 29 is a diagram showing one example of a message format of the contents confirmation response.

DETAILED DESCRIPTION OF THE INVENTION

Figure 3:
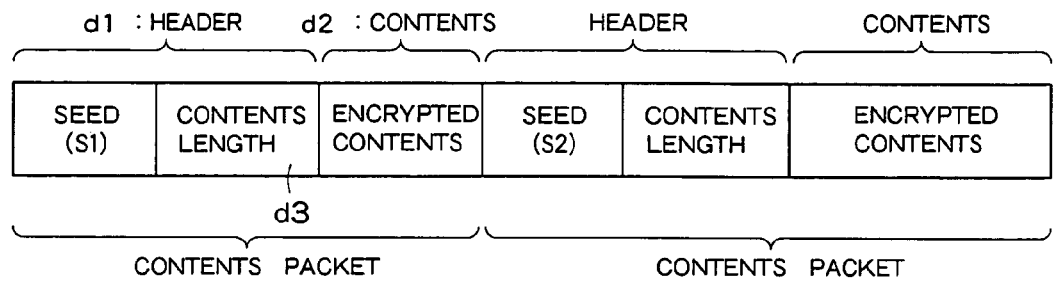
FIG. 3 is a diagram showing one example of a transfer format that is used when the transmitter A transmits encrypted contents to the receiver B.

Hereafter, an embodiment of the present invention will be described more specifically with reference to the drawings.

First Embodiment

FIG. 1 is a block diagram showing a schematic configuration of a contents transmitting and receiving system having an information processing apparatus according to a first embodiment of the present invention. The contents transmitting and receiving system shown in FIG. 1 has an object of transmitting and receiving mainly audio and audiovisual data within a range in which individual persons use the data. This system includes a transmitter A, a receiver B, and a receiver C that are connected to a local area network 10. Alternatively, these devices can be connected to each other with a router or a bridge (both not shown). At least one of the transmitter A, and the receivers B and C can be an information processing apparatus according to the embodiment of the present invention.

A physical layer and a link layer of the local area network (hereinafter, LAN) 10 can be implemented by various forms such as a wireless LAN based on the IEEE802.11, Ethernet (a registered trademark), and the IEEE1394. The network layer of the LAN 10 can be IPv4 or IPv6, when the Internet Protocol (hereinafter simply referred to as IP) is used. The LAN 10 can be connected with devices other than the transmitter A, the receiver B, and the receiver C. To simplify FIG. 1, these other devices are not shown.

Here, we assume that the transmitter A transmits contents to the receivers B and C. To simplify the explanation, the contents are digital contents (hereinafter simply referred to as contents) to be transmitted in a state that the contents are copyright-protected. In other words, when the receiver B requests the transmitter A for desired contents, the receiver B can detect a device other than the transmitter A and the receiver B illegally obtains and copies the contents and that the transmitter A or other device transmits contents different from the contents requested by the transmitter B.

The present embodiment has broadly the following two characteristics.

(A First Characteristic)

When there is no means for encryption, the contents can be easily copied on a transmission path between the transmitter and the receiver. To overcome this problem, according to the present embodiment, prior to the transmission and reception of the contents, a processing is carried out to enable the transmitter and the receiver to share a secret in advance. The transmitter and the receiver encrypt and decrypt the contents using this secret. In this way, it is possible to prevent the contents from being copied by a device having no common secret. In order to increase the encryption strength, a key used to encrypt the contents is updated periodically.

(A Second Characteristic)

When the receiver transmits a request for the contents to the transmitter, there is a risk that this request for the contents is changed on the transmission path between the transmitter and the receiver. As a result, the receiver may receive contents different from the requested contents. To overcome this problem, according to the present embodiment, during the reception of the contents, the receiver inquires the transmitter about whether the contents being received by the receiver and the contents being transmitted from the transmitter are encrypted with the same key. In this way, it is confirmed that the contents being processed by the receiver and the contents currently being processed by the transmitter are the same contents.

An example of the operation that the receiver B shown in FIG. 1 requests the transmitter A to transmit contents, and the receiver B receives the contents, is explained below.

FIG. 2 is a block diagram showing a schematic configuration of the transmitter A according to the present embodiment. The transmitter A shown in FIG. 2 has the network interface 1, a packet processor 2, a data connection manager 3, an authentication & key exchange connection manager 4, an authentication & key exchange processor 5, an encryption processor 6, a contents supplier 7 and a seed collector 8.

The network interface 1 executes processings of a physical layer and a data link layer to communicate with the receiver B. The packet processor 2 executes a network layer and transport layer processing to communicate with the receiver B. The authentication & key exchange processor 5 carries out an authentication & key exchange processing with the receiver B. The data connection manager 3 manages a connection for transmitting and receiving contents (a connection B). The authentication & key exchange connection manger 4 manages a connection for exchanging authentication & key (a connection A).

When the authentication & key exchange processing is successful, the authentication & key exchange processor 5 generates an authentication key as a private key to be used to encrypt and decrypt the contents with each receiver B. The authentication key is a value of a key that is shared with all receivers that are successful in the authentication & key exchange processing. The authentication & key exchange processing refers to the following processing. The transmitter A and the receiver B mutually authenticate that both devices have properly received a license from a certain licensing organization. When it is confirmed that the transmitter A and the receiver B are compliant devices, a common key is generated. To execute the authentication, a known method such as the ISO/IEC 9798-3 or the ISO/IEC 9798-2 can be used.

The encryption processor 6 calculates a key to encrypt contents, and decrypt the contents. The encryption processor 6 generates a key to encrypt the contents using the key (authentication key (K)) shared by the authentication & key exchange processing. The key (contents key Kc) that is used to encrypt the contents is calculated from a function (F) using parameters K (the authentication key) and S (seed):

$$Kc=F(K,S)$$

The function F can be calculated according to (1) a method using an encryption algorithm such as the AES (advanced encryption standard), (2) a method using a hash function such as the SHA-1, and (3) a method combining the methods (1) and (2). The parameters of the function F can include parameters other than the authentication key K and the seed S.

The contents key Kc is calculated from the seed S and the authentication key K, thereby encrypting the contents. As an encryption algorithm for the encryption and the decryption, a known method such as the AES can be used. The contents supplier supplies the contents to the encryption processor.

The seed S is a value that changes based on time or an accumulated amount of data to be encrypted. To update the seed, there are (1) a method of changing the seed based on a constant time or a constant time range, (2) a method of changing the seed based on an accumulated amount of transmission data, and (3) a method of selecting the time or the accumulated amount of transmission data whichever is updated earlier. Because the contents key is generated using the seed, the contents key is also updated based on time and a data amount.

When the transmitter A transmits contents to plural receivers B, the transmitter A transmits the contents asynchronously to each receiver B, depending on a transfer protocol to be used for the transmission and a band of the network. Therefore, when the transmitter A starts simultaneously transmitting the contents to the receiver B and the receiver C at a certain time T, for example, data of M megabytes is transmitted to the receiver B and data of N megabytes is transmitted to the receiver C, at a point of time of the time T+X. Accordingly, when the method (2) is used, the timing of updating the seed is also different for each receiver B. For example, when the seed is updated each time when the transmitter A transmits one megabyte data, the seed is updated M times for the receiver B, and the seed is updated N-times for the receiver C. As methods of updating the value of the seed, there are (a) a method of generating a random number each time, and (b) a method of generating a random number at a first time, and changing the random number by a constant number at a second time and after (for example, a method of increasing the value of the random number by one at each time). It is assumed that the random number is changed based on the method (b) in the following explanation.

The seed collector 8 collects all seed values while the transmitter A is carrying out a processing, and accumulates the seed values as a seed list. When any one of the seeds that the transmitter A manages is updated, the seed list is also updated.

FIG. 3 is a diagram showing one example of a transfer format that is used when the transmitter A transmits encrypted contents to the receiver B. As shown in FIG. 3, the contents are divided into an optional data length, and the contents are transferred as a contents packet including a header d1 and contents d2. The contents d2 mean the encrypted contents. The header d1 consists of a seed S (S1, S2, etc.) that is used to calculate a contents key, and a contents length d3. The seed S is used to generate the contents key, and can be transmitted in a plain text, because a device having no authentication key K cannot obtain the contents key Kc. The header d1 can contain other information concerning contents. The contents d2 contains the encrypted contents.

Figure 4:
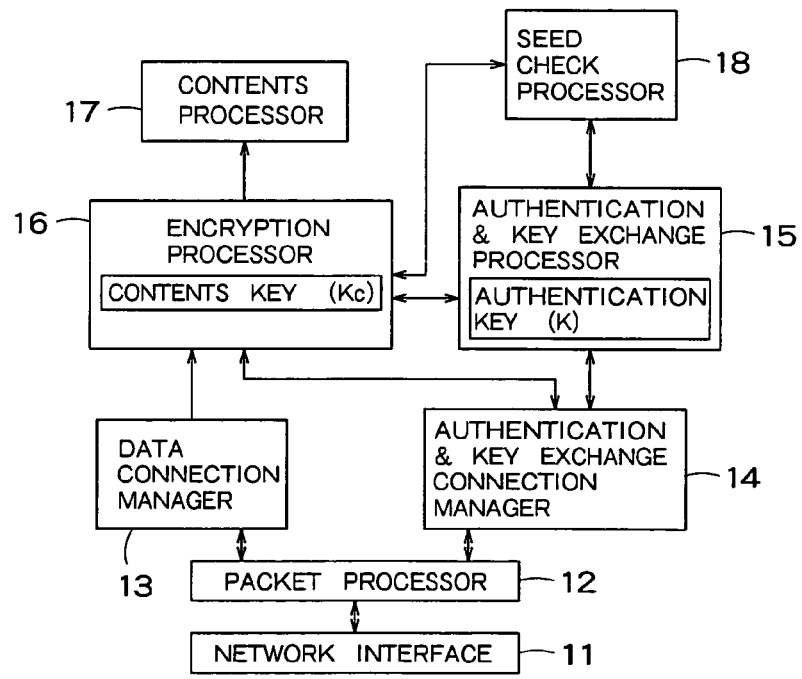
FIG. 4 is a block diagram showing a schematic configuration of the receiver B according to the present embodiment.

FIG. 4 is a block diagram showing a schematic configuration of the receiver B according to the present embodiment. As shown in FIG. 4, the receiver B has a network interface 11, a packet processor 12, a data connection manager 13, an authentication & key exchange connection manger 14, an authentication & key exchange processor 15, an encryption processor 16, a contents processor 17 and a seed check processor 18.

The network interface 11, the packet processor 12, the data connection manager 13, the authentication & key exchange connection manger 14, and the authentication & key exchange processor 15 have functions similar to those of the corresponding blocks within the transmitter A, and can be configured with similar blocks.

The encryption processor 16 calculates the contents key Kc, and decrypts the contents. The contents key Kc is obtained by the function F using the authentication key K calculated by the authentication & key exchange processing with the transmitter A, and the value of the seed S included in the contents header of the contents packet received from the receiver B. The encryption processor 16 decrypts the contents of the contents packet corresponding to the contents header using the contents key Kc. The contents processor 17 outputs the received contents to a display unit, or stores the contents.

The seed check processor 18 checks whether the seed value included in the header of the contents packet currently being processed coincides with the seed value that the transmitter A is processing at present, or whether these seed values are within a certain range, when a certain condition is satisfied.

Figure 5:
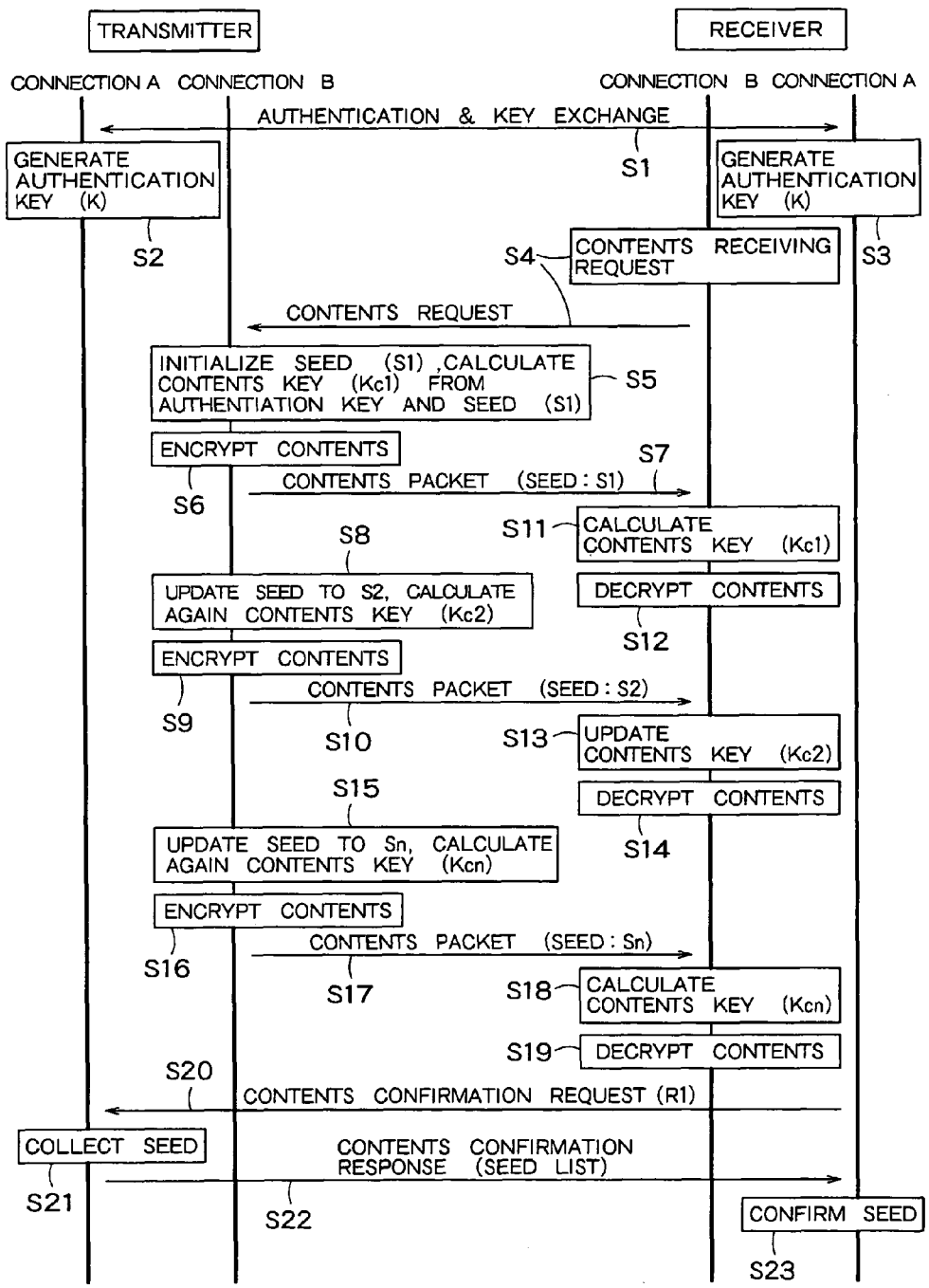
FIG. 5 is a flowchart showing a processing procedure of the contents transmitting and receiving system according to the present embodiment.

FIG. 5 is a flowchart showing a processing procedure of the contents transmitting and receiving system according to the present embodiment. According to the present embodiment, two communication connections A and B are present between the transmitter A and the receiver B. The connection A is used to exchange the authentication & key, and the connection B is used to transmit contents.

First, the transmitter A carries out the authentication & key exchange processing with the receiver B (steps S1 to S3). As a result, the transmitter A and the receiver B share the authentication key K.

Next, the receiver B transmits a contents reception request to the transmitter A (step S4). The contents reception request is generally transmitted using a plain text in the form of an HTTP GET request, when HTTP (hypertext transfer protocol) is used as a contents transfer protocol. When RTP (real-time transport protocol) is used as a contents transfer protocol, the connection B is used to transfer the contents. The connection C that is different from the contents transfer connection B is used to carry out the contents reception request.

Upon receiving this request, the transmitter A generates a contents key (Kc1) from the seed S1 and the authentication key K calculated in advance (step S5). Next, the transmitter A encrypts the contents with the generated contents key (Kc1) (step S6), and transmits the contents packet to the receiver B, by including the seed S1 in the contents header and including the encrypted contents in the contents of the contents packet (step S7).

Thereafter, after transmitting a certain amount of data, the transmitter A updates the seed (S2), and re-calculates the contents key (Kc2) (step S8). The transmitter A encrypts the contents with the recalculated contents key (Kc2) (step S9), generates a contents packet in a manner similar to that at step S7, and transmits the generated contents packet (step S10).

On the other hand, the receiver B confirms the seed value included in the header of the contents packet transmitted at step S7 from the transmitter A, calculates the contents key (step S11), and decrypts the contents (step S12).

The receiver B confirms the seed value included in the header of the contents packet transmitted at step S10 from the transmitter A, updates the contents key when the seed is updated (step S13), and decrypts the data included in the contents with the updated contents key (step S14).

As the internal processing of the transmitter A, it is not always necessary to calculate the contents key after updating the seed. Instead, the transmitter A can calculate a contents key using a seed value updated in advance, and update the contents key in time with the updating of the contents packet. Similarly, when the next seed value can be read beforehand, the receiver B can calculate the contents key in advance from the seed value read beforehand, and update the contents key simultaneously with the updating of the seed value of the header of the contents packet. By devising the updating of the key in this way, the contents key can be updated without a delay, in time with the updating of the contents header of the contents packet. As a result, encryption and decryption can be carried out at a high speed.

Logically different connections can be used for the authentication & key exchange and for the contents transfer. (For example, when TCP/IP is used for the communication protocol, different TCP connections are used. TCP is used for the authentication & key exchange, and UDP is used for the contents transfer. Alternatively, when IEEE1394 is used for the communication protocol, the asynchronous channel is used for the authentication & key exchange, and the Isochronous channel is used for the contents transfer). In the following explanation, it is assumed that communications are carried out using separate connections. A connection for the authentication & key exchange is called an authentication key exchange connection, and a connection for the contents transfer is called a data connection.

The transmitter A periodically updates the seed value. When the seed value is updated to Sn, the transmitter A recalculates the contents key (step S15). The transmitter A encrypts the contents (step S16), and transmits the encrypted contents packet (step S17).

The receiver B calculates a contents key Kcn using a seed value Sn (step S18), and decrypts the contents (step S19), in a manner similar to that at steps S11 to S14.

The receiver B makes a contents confirmation request to the transmitter A at a predetermined timing (step S20). The timing for making the contents confirmation request is described in detail later.

The receiver B collects seeds, and creates a list of seed values (a seed list) owned at present by the receiver B (step S21). The transmitter A transmits the created seed list to the receiver B, in response to the contents confirmation request (step S22).

The receiver B confirms the seed value included in the seed list (step S23). In this case, the receiver B confirms whether the seed owned by the receiver B itself is included in the seed list transmitted from the transmitter A. When the seed owned by the receiver B is included in the seed list transmitted from the transmitter A, the receiver B determines that the seeds coincide with each other. When the seed is not included in the seed list, the receiver B determines that the seeds do not coincide with each other.

When the confirmation of the seed is successful, the transmission and reception of the contents are continued using the connection B. On the other hand, when the confirmation of the seed is not successful, the receiver B can transmit again the contents confirmation request to the transmitter A. When the seed confirmation is continuously unsuccessful even after making the contents confirmation request by a predetermined number of times, the receiver B stops decrypting the contents.

The timing for making the contents confirmation request at step S20 is explained next. The following four kinds of conditions (1) to (4) are considered to make the contents confirmation request. The contents confirmation request is started at a point of time when at least one of the following conditions (1) to (4) is satisfied.

(1) After a contents key Kc is generated for the first time using the exchange key (K), the contents are decrypted with this contents key Kc.

(2) Although the receiver B knows a method of updating the seed in advance, the seed is updated to an unexpected value against the updating method. For example, although it is determined in advance between the transmitter A and the receiver B that a seed is increased by one each time, a contents packet including a seed having a seed value other than S or S+1 is decrypted next to the contents packet having the seed value S.

(3) Although the receiver B knows a timing of updating the seed in advance, the seed is updated at an unexpected timing against the updating timing. For example, although it is determined in advance between the transmitter A and the receiver B that a seed is increased when a predetermined amount of data is transmitted, the seed is updated before the seed value reaches the predetermined amount.

(4) After a TCP connection for data connection is once disconnected, the TCP connection is connected to the transmitter A again to start reception of a contents packet.

The contents confirmation processing includes a transmission of a contents confirmation request from the receiver B, and a transmission of a contents confirmation response from the transmitter A. A connection different from the data connection can be used for the contents confirmation data. When a different connection is used, the connection can be the same as the connection for the authentication key exchange.

FIG. 6 is a flowchart showing one example of a detailed processing procedure of the contents confirmation processing that the receiver B carries out. FIG. 7 is a flowchart showing one example of a detailed processing procedure of the contents confirmation processing that the transmitter A carries out. First, the receiver B generates a random number R1 (step 531), and obtains and stores a seed Sr1 of the contents header of the contents packet currently being received (step S32).

Next, the receiver B transmits a contents confirmation request including the random number R1 to the transmitter A (step S33).

Figure 8:
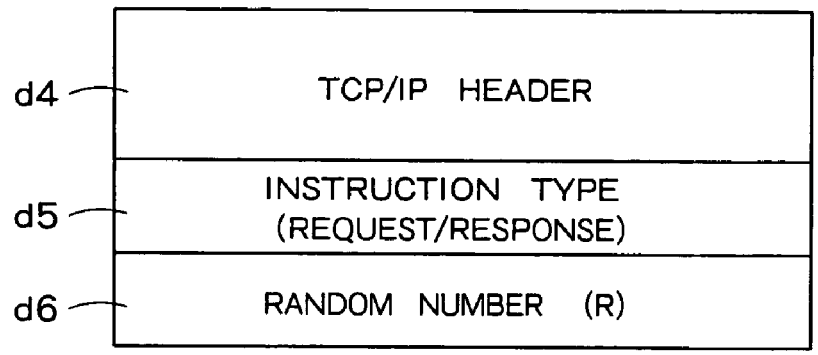
FIG. 8 is a diagram showing one example of a format of a message of the contents confirmation request.

FIG. 8 is a diagram showing one example of a format of a message of the contents confirmation request. As shown in FIG. 8, the message of the contents confirmation request has a TCP/IP header d4, an instruction type (request/response) d5, and a random number (R1) d6.

Upon receiving a contents confirmation request from the receiver B (step 551), the transmitter A obtains the random number R1 included in the contents confirmation request message (step 552). Next, the transmitter A creates a random number R2 that is obtained by copying the random number R1 (step 553). The transmitter A obtains all seeds that are currently used, and creates a seed list in which the whole seeds are collected (step S54).

A reason why the transmitter A returns the whole seeds being processed (in use) to the receiver B is explained below. When the transmitter A receives the contents confirmation request from the receiver B, there is a possibility that the transmitter A is in the middle of transmitting the contents to other receiver B at the same time, or transmitting plural contents to the receiver at the same time. To simplify the explanation, it is assumed that the transmitter A transmits the same contents to the receiver B and the receiver C.

When the RTP (real-time transfer protocol) is used as the contents transfer protocol, one set of contents can be distributed to plural receivers B by multicasting. Therefore, regardless of the number of receivers B, the transmitter A can encrypt only one set of contents. However, when the protocol of establishing a connection for each receiver B like the HTTP is used as the audiovisual data transfer protocol, the amount of data to be transmitted during a certain constant time is different for each connection. Therefore, the seed is updated for each connection. Accordingly, the transmitter A needs to manage seeds by the number of connections.

We assume that the receiver B transmits a contents confirmation request to the transmitter A. As described above, the data connection and the authentication key exchange connection are separate logical connections. Therefore, the transmitter A cannot identify the transmitter B that transmits the protocol confirmation request. Although there is a method of identifying the transmitter B using the IP address, it is not possible to identify the transmitter B when an NAT (network address translation) device is present between the transmitter A and the receiver B. Accordingly, the transmitter A transmits the whole seeds being processed to any receiver.

Next, the transmitter A obtains all the seeds (S1, S2, . . . , and Sn) being processed (step 555). The transmitter A creates an encrypted message M based on a function G shown in the following expression (1) using the whole obtained seeds and the random number R2 obtained by copying the random number R1 with the authentication key K.

$$M=G(K,R2\|S1\|S2\|\ldots\|Sn) \quad (1)$$

where K denotes the authentication key, and a symbol of operation "∥" denotes a concatenation. The function G denotes a processing of encrypting a message obtained by concatenating the random number R2 and the seed S using the key K.

Depending on the encryption algorithm, padding is necessary in addition to the message to be encrypted. In this case, a padding length field or a data length field of the data to be encrypted is defined in the header, and the encryption processing is carried out including the padding.

Figure 9:
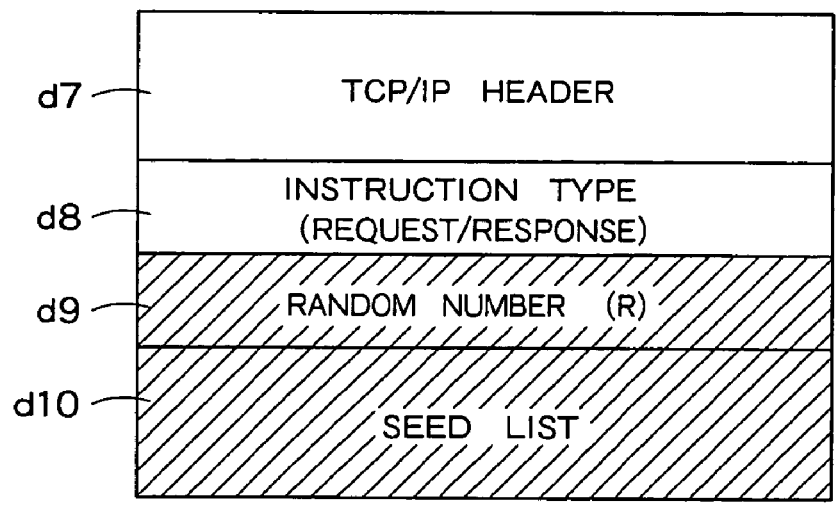
FIG. 9 is a diagram showing one example of a format of the contents confirmation response including the message M that the transmitter A transmits.

Next, the transmitter A transmits a response message including a message (M) to the receiver B (step S56). FIG. 9 is a diagram showing one example of a format of the contents confirmation response including the message M that the transmitter A transmits. As shown in FIG. 9, the message of the contents confirmation response has a TCP/IP header d7, an instruction type (request/response) d8, a random number (R1) d9, and a seed list d10. The random number and the seed list indicated by diagonal lines in FIG. 9 are transmitted after being encrypted.

When the transmitter A transmits the contents confirmation response in the above process, the receiver B carries out the processing at step S34 and afterward shown in FIG. 6. First, the receiver B receives the contents confirmation response transmitted from the transmitter A (step S34), decrypts the message included in the contents confirmation response using the authentication key K, and obtains the random number R2 and the seed list (step S35).

The receiver B checks whether the obtained random number R2 coincides with the random number R1 owned by the receiver B (step S36). When the obtained random number R2 does not coincide with the random number R1, the receiver B returns an error message without carrying out the following processing (step S37). When the obtained random number R2 coincides with the random number R1, the receiver B obtains the header seed S1 from the seed list obtained at step S35 (step S38). The obtained seed S1 is input to a variable Sk.

The receiver B determines whether the seed Sr obtained at step S32 is included in the range of the following expression (2) (step S39).

$$Sk-X \leq Sr \leq Sk+Y \quad (2)$$

where X denotes a positive integer, and Y denotes zero.

Therefore, the expression (2) is equivalent to $Sk-X \leq Sr \leq Sk$.

When it is determined at step S39 that the seed Sr is included in the range, the processing ends. When it is determined at step S39 that the seed Sr is not included in the range, the receiver B determines whether seeds not yet checked are present in the seed list (step S40). When seeds not yet checked are present in the seed list, the receiver B selects one of the seeds not yet check (step S41), and the process shifts to step S39.

As described above, at steps S38 to S41, the receiver B checks whether seeds currently being processed (in use) are included in the seed list transmitted from the transmitter A. When seeds are included in the list, the receiver B can confirm that the contents currently being received are certainly being transmitted from the transmitter A and that the contents are those which the transmitter A is currently processing.

When the receiver B transmits the contents confirmation request to a wrong transmitter A, a random number and a seed list cannot be correctly decrypted because the authentication key value is different. As a result, an error occurs in the match test of random numbers. When the random numbers coincide with each other but the seed Sr is not included in the range of the expression (2), the transmitter A and the receiver B have the authentication key K. However, the contents that the receiver B is currently processing are the contents that the transmitter A processed in the past or is going to process in future. Therefore, it is possible to confirm that the contents are not those currently being processed. In this case, an error occurs, because the processing normally ends only when the contents are those currently being processed.

At the time of checking whether the seed Sr currently being processed is included in the seed list at step S39, a reason why the seed Sr is compared with a range in which the seed is present, instead of checking a complete matching, is explained below.

FIG. 10 is a diagram showing a seed update timing of the transmitter A and a seed update timing of the receiver B. In FIG. 10, a horizontal axis expresses time. The receiver B updates a seed after the seed is received from the transmitter A. Therefore, the transmitter A updates the seed earlier than the receiver B does.

The contents are divided into pieces of an optional size, and are transmitted from the transmitter A to the receiver B as contents packets. The contents confirmation request and the contents confirmation response (hereinafter, contents confirmation data) are transmitted and received using a connection different from that for the contents packet.

In this case, there is a possibility that different delays occur between the data connection and the authentication key exchange connection on the network or within the devices due to a retransmission processing or the like attributable to a packet loss. For example, at the time of transmitting audiovisual data, a transmission/reception data amount of the contents data during a constant time is larger than that of the authentication key exchange data and the contents confirmation data as management data. Therefore, the data connection manager 3 has a possibility of having a buffer larger than that of the authentication & key exchange connection. Because of this buffer, there is a possibility that the encryption processor 6 and the authentication key exchange processor 5 have a larger delay in the processing of the contents data in the application layer.

We assume that, at the point of time when the receiver B transmits the contents confirmation request, the value of the seed Sr of the contents packet is Sa. When the transmitter A receives the contents confirmation request, the value of the seed of the contents packet is Sb after being updated from Sa. Therefore, the transmitter A returns a contents confirmation response S1 to the receiver B by inserting Sb into this response. The receiver B receives the contents confirmation response, checks whether Sr (=Sa) coincides with S1 (=Sb), and detects that these values do not coincide with each other.

As explained above, even when the receiver B and the transmitter A are valid devices, respectively, the disagreement of the seeds is detected due to the delay in the seed attributable to the buffer. As a result, the transmitter A cannot transmit the contents to the receiver B.

Accordingly, at step S39 in FIG. 6, at the time of checking the coincidence between Sr and S1, the check is carried out by providing a constant range, instead of checking a complete matching. The value of X in the above expression (2) can be determined based on a method of updating a seed, and a delay generated on the transmission path or inside the devices.

While FIG. 6 shows the example of receiving the message M from the transmitter A after the receiver B obtains the seed Sr currently being processed, the receiver B can obtain the seed Sr currently being processed after receiving the message M.

FIG. 11 is a flowchart showing a processing procedure of the receiver B according to a modification of the process shown in FIG. 6. In the process shown in FIG. 11, after receiving the message M from the transmitter A (step 562), the receiver B obtains the seed Sr currently being processed (step S63). Operations at steps other than these steps are similar to those shown in FIG. 6.

FIG. 12 is a graph showing a seed update timing of the transmitter A and a seed update timing of the receiver B. In FIG. 12, a horizontal axis represents time. As is obvious from FIG. 12, the timing when the receiver B obtains the seed Sr currently being used is shifted to a later timing. Therefore, there is a possibility that a difference between the timing of the seed Sr and the timing of the seed currently being used becomes smaller than that shown in FIG. 10. However, both seeds are different in FIG. 12.

Therefore, a range is provided to each seed within the seed list, as shown at step S68 in FIG. 11. Values of X and Y can be determined based on a method of updating a seed, and a delay generated on the transmission path or inside the devices.

FIG. 13 is a sequence diagram showing an example different from that shown in FIG. 12. In the process shown in FIG. 12, the transmitter A inserts a seed Sc currently being processed into the seed S1 of the contents confirmation response. However, a delay in the contents data is large like that shown in FIG. 12. Therefore, the seed Sc obtained in the contents confirmation response does not coincide with the seed Sb added to the contents packet received in advance by the receiver B. In other words, Sc>Sb, that is, Sr>S1. Accordingly, the search processing is unsuccessful even when the seeds coincide completely with each other or in the case of FIG. 13. In this case, the receiver B provides a range to each seed within the seed list, and compares the seed with the seed Sr, as shown at step S68 in FIG. 11. X and Y are positive integer values.

It is explained above that the contents confirmation request and the contents confirmation response end in one return processing. However, in some cases, the contents confirmation response is delayed extremely due to the processing load of the transmitter A, or due to a network delay or a router processing delay between the transmitter A and the receiver B. In this case, the receiver B cannot easily receive the contents confirmation response, and cannot confirm the seed or transmit the contents accordingly. Therefore, in order to realize the present embodiment, it is necessary to prescribe a timeout value of completing the contents confirmation processing since the receiver B starts this processing.

FIG. 14 is a flowchart showing one example of a time limit processing of the contents confirmation response that the receiver B carries out. When the contents confirmation processing is started, a timer starts measuring time (step S81), and the receiver B transmits the contents confirmation request to the transmitter A (step S82).

Thereafter, the receiver B receives a contents response corresponding to the contents confirmation request (step S83), and executes a contents confirmation check processing (step S84). When this processing is successful, the processing normally ends (step S85). When this processing is unsuccessful, a lapse time of the timer is confirmed (step 586). When the timer indicates a lapse of a certain time, the processing ends abnormally (step S87). When the time is within the limit, the receiver B transmits the contents confirmation request again (step S82).

In the processing shown in FIG. 14, a timer is used to limit the time taken until when the contents confirmation processing is successful. Alternatively, the timer can be set to the contents confirmation request and the contents confirmation response for one time, and a limit can be set to a number of times of carrying out the contents confirmation request and the contents confirmation response.

FIG. 15 is a flowchart showing a modification of the processing shown in FIG. 14. First, a variable N for counting the number of times when the timer is off is initialized to zero (step S91). Next, the timer starts measuring time (step S92), and the receiver B transmits a contents confirmation request (step S93). The receiver monitors the timer until when the contents confirmation response is received (step S94).

When the contents confirmation response is received before the timer is off (step S95), the receiver executes the contents confirmation check processing (step S96). When the contents confirmation check processing is successful, the processing ends normally (step S97). When the contents confirmation check processing is unsuccessful, the processing ends abnormally (step S98). When the timer is off before the receiver B receives the contents confirmation response, the contents confirmation check processing is interrupted/canceled (step S99). The variable N for counting the number of times when the timer is off is increased by "1" (step S100), and it is determined whether the variable is less than a maximum number of times (MAX) (step S101). When the number is less than the maximum number of times, the processing at step S92 and the subsequent processings are repeated. When the number is equal to or exceeds the maximum number of times, the processing ends abnormally (step S98).

When the contents confirmation check processing shown in FIGS. 14 and 15 is unsuccessful, i.e. the contents confirmation check processing is suspended abnormally, the receiver B carries out at least one of the following abnormal processing (1) to (3).

(1) Abandon the authentication key K.

(2) Stop decryption of the contents packet at the point of time when the contents confirmation processing is unsuccessful. When the contents confirmation processing is successful after repeating this processing and also when the authentication key K is held, the receiver B can start again the decryption of the contents.

(3) Stop decryption of the contents packets after the point of time when the contents confirmation processing is unsuccessful.

As described above, according to the first embodiment, the receiver B performs a contents confirmation request to the transmitter A. In response to this request, the transmitter A collects the seed currently being processed, and transmits the seed list including all collected seeds to the receiver B. The receiver B compares the seed with the seed currently owned. Therefore, the receiver B can accurately determine whether the transmitter A that transmits the contents to the receiver B is the intended transmitter. Accordingly, it is possible to avoid the risk of transmitting and receiving the contents between the devices other than the transmitter A and the receiver B. Therefore, the copyright of the contents can be protected.

More specifically, according to the present embodiment, when the receiver B requests desired contents to the transmitter A, the receiver B can securely detect misconducts such as illegal acquisition and copy by an intermediate device, that the transmitter A or the other device transmits contents different from that request by the receiver B, and that contents being processed by the receiver B is different from contents being transmitted by the transmitter A.

illegally

Second Embodiment

According to a second embodiment, the transmitter A transmits the contents confirmation response to the receiver B by including the seed list as a plain text. An example that the receiver uses a hash function to check the validity of the seed list is explained.

Internal configurations of the transmitter A and the receiver B according to the second embodiment are similar to those shown in FIG. 2 and FIG. 4. Therefore, differences between the second embodiment and the first embodiment are mainly explained below.

The transmitter A that receives the contents confirmation request transmitted from the receiver B copies all seeds (S1, S2, . . . , and Sn) currently being processed, and, the random number R1 included in the contents confirmation request, and generates the message M2 using the following function H. A well-known unidirectional hash function such as the SHA-1 can be used as the hash function for the function H.

$$M2 = H(K\|R2\|S1\|S2\| \ldots \|Sn) \quad (3)$$

where K denotes an authentication key, and the symbol of operation "|" denotes a concatenation.

The transmitter A transmits a response message including the message M2 and the plain text seed list, to the receiver B. FIG. 16 is a diagram showing one example of a format of the contents confirmation response message including the message M2 transmitted from the transmitter A. In FIG. 16, an encrypted text d11 denotes the message M2, and the seed list includes the seeds S1, S2, . . . , and Sn that the transmitter A is currently processing. The seed list d12 includes values that are used for the confirmation processing, and therefore, can be transmitted in a plain text.

The receiver B checks whether the seed Sr currently being processed is included in the contents confirmation response. FIG. 17 is a flowchart showing a processing procedure of the receiver B according to the second embodiment. The processing at steps S111 to S118 is similar to the processing at steps S31 to S34 and steps S38 to S41 shown in FIG. 6.

The receiver B checks whether the seed Sr is included in the plain text seed list included in the contents confirmation response (steps S115 to S118). When the seed Sr is not included in the plain text seed list, an error processing is carried out (step S119). When the seed Sr is included in the plain text seed list, the receiver B concatenate the authentication key, the random number R1 included in the contents confirmation request, and the plain text seed list included in the contents confirmation response, and obtains a message M3 from the function H (step S120).

$$M3 = H(K\|R1\|S1.S2\| \ldots \|Sn) \quad (4)$$

Next, the receiver B determines whether the calculated message M3 coincides with the message M2 transmitted from the transmitter A (step S121). When the calculated message M3 coincides with the message M2, the receiver B ends the processing normally (step S122), and when they do not coincide with each other, the receiver B returns an error message (step S120).

As described above, according to the second embodiment, the transmitter A transmits the seed list in a plain text, and the receiver B checks the processing before operating the encryption processor 16. Therefore, when the check processing is unsuccessful, the encryption processing can be omitted, thereby making the processing more efficient. Even if an intermediate device illegally rewrites the seed list such that the receiver B can check the coincidence of seeds, the intermediate device cannot calculate a correct hash value because the intermediate device has no authentication key, although the receiver B is successful in the seed confirmation processing. Therefore, the receiver B cannot subsequently confirm the coincidence of hash values. In this way, it is possible to prevent the intermediate device from illegally changing the seed list.

As described above, according to the second embodiment, the transmitter A receives a contents confirmation request, calculates a hash value using a random number included in the contents confirmation request, and transmits a contents confirmation response including the calculated hash value. The receiver B receives this contents confirmation response, and checks whether the hash value calculated by the receiver B coincides with the hash value included in the contents confirmation response. Therefore, the receiver B can verify whether the transmitter A that transmits the contents confirmation response is the intended communication partner, more efficiently than the process according to the first embodiment.

Third Embodiment

In the first and the second embodiments, examples that the receiver B confirms the seed have been explained. According to the third embodiment, the transmitter A also confirms the seed.

FIG. 18 is a block diagram showing a schematic configuration of the transmitter A according to the third embodiment. The transmitter A shown in FIG. 18 has the seed check processor 18, and is different, in this respect, from the transmitter A shown in FIG. 2. The seed check processor 18 checks whether the value of the seed received by the contents confirmation request from the receiver B is included in the seed list of the seed collector 8.

FIG. 19 is a block diagram showing a schematic configuration of the receiver B according to the third embodiment. The receiver B shown in FIG. 19 has a seed storage 19 in place of the seed check processor 18, and is different, in this respect, from the receiver B shown in FIG. 4. The seed storage 19 stores a seed value included in the header of the contents packet currently being processed. The authentication & key exchange processor 15 refers to the seed value at the time of transmitting a contents confirmation request to the transmitter A. When the seed value of the header changes, the seed storage 19 updates the seed value to the changed value.

Figure 21:
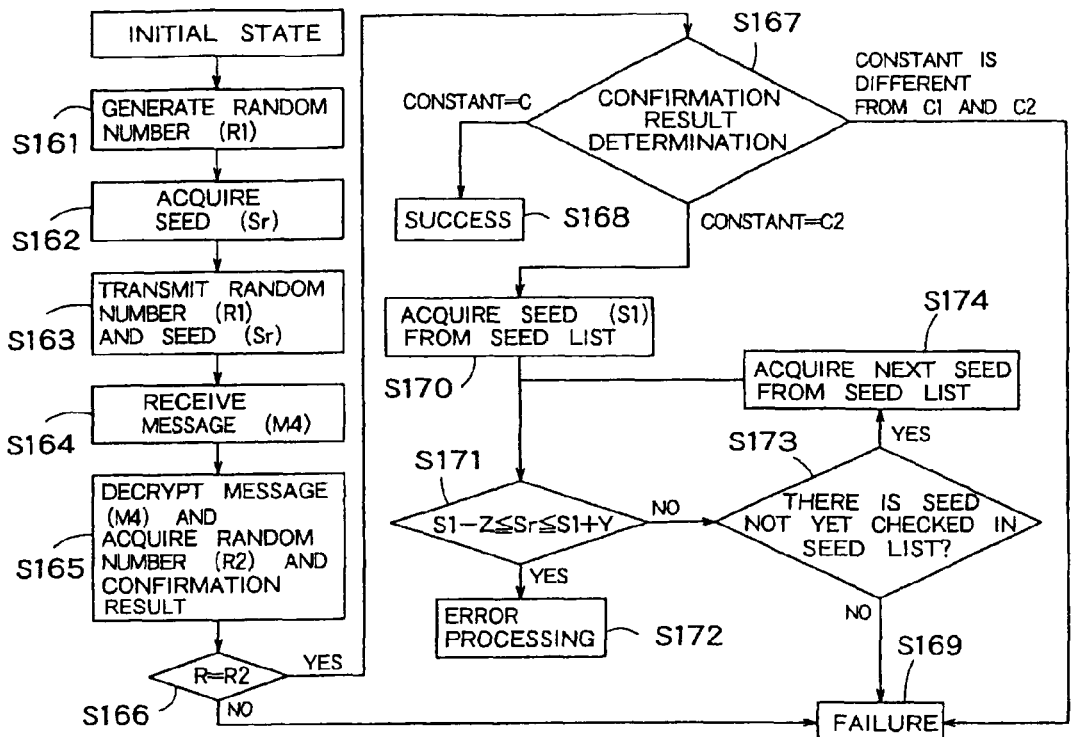
FIG. 21 is a flowchart showing one example of a processing procedure of a contents confirmation processing that the receiver B carries out.
Figure 22:
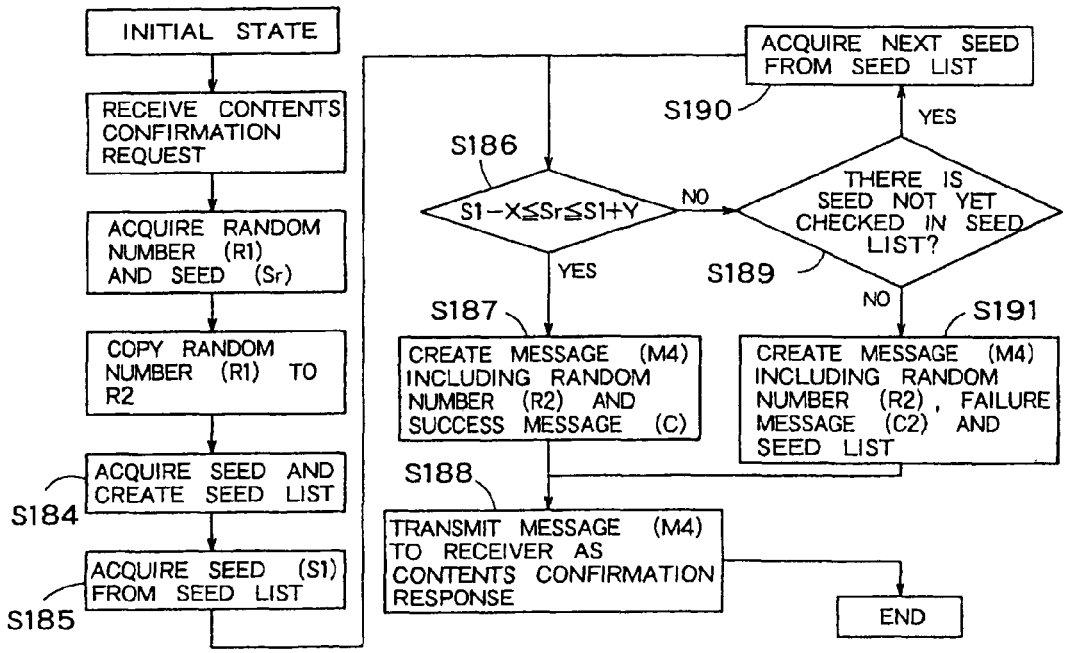
FIG. 22 is a flowchart showing one example of a processing procedure of a contents confirmation processing that the transmitter A carries out.

FIG. 20 is a sequence diagram showing one example of a processing procedure that is carried out between the transmitter A shown in FIG. 18 and the receiver shown in FIG. 19. FIG. 21 is a flowchart showing one example of a processing procedure of a contents confirmation processing that the receiver B carries out. FIG. 22 is a flowchart showing one example of a processing procedure of a contents confirmation processing that the transmitter A carries out.

The transmitter A and the receiver B carry out the authentication & key exchange processing, and generate a contents key using the authentication key K and the seed value. The transmitter A encrypts the contents, and transmits the encrypted contents to the receiver B. The receiver B makes a contents confirmation request. (Steps S131 to S150). The processing up to this stage is common to that shown in FIG. 5.

The receiver B stores the seed (Sr1) of the header of the contents packet currently being received, generates the random number R1, and transmits a content confirmation request including the seed (Sr1) and the random number to the transmitter A (steps S161 to S163). In the example shown in FIG. 20, the seed value of the contents header is Sa. Therefore, the seed Sa and the random number R1 are included in the contents confirmation request, and this contents confirmation request is transmitted.

FIG. 23 is a diagram showing one example of a message format of the contents confirmation request. As shown in FIG. 23, the contents confirmation request includes the random number (R1) d6 generated by the receiver B, and the seed (Sr, in this case, Sa) d13.

The transmitter A receives the contents confirmation request, collects the seeds (steps S151 and S184), and confirms the collected seeds (steps S152, and S185 to S191). More specifically, the transmitter A checks whether the seed Sr included in the contents confirmation request from the receiver B is included within the range of the following expression (5) out of all seeds (S1, S2, . . . , and Sn) currently being processed (step S186).

$$S1-X \leq Sr \leq S1+Y \quad (5)$$

where X denotes a positive integer value, and Y denotes 0.

When the comparison check is successful, the transmitter A obtains the random number R2 obtained by copying the random number R1 included in the contents confirmation request, and creates a message M4 using the function I shown in FIG. (6) (steps S187 and S191). As the encryption algorithm used for the function I, a well-known algorithm like the AES can be used.

$$M4=I(K,R2\|C) \quad (6)$$

where K denotes an authentication key, and the symbol of operation "∥" denotes a concatenation. A success message C is a constant determined in advance between the transmitter A and the receiver B. At the time of creating M4, it is preferable that M4 includes the seed Sr included in the contents confirmation request, in addition to the random number R2 and the success message C. The function I denotes the processing of encrypting the message in which R2 and C are concatenated, using the key K. Depending on the encryption algorithm, padding is necessary in addition to the message to be encrypted. In this case, a padding length field or a data length field of the data to be encrypted is defined in the header, and the encryption processing is carried out including the padding.

The transmitter A transmits a response message including the message M4 to the receiver B (steps S153 and S188).

FIG. 24 is a diagram showing one example of a message format of the contents confirmation response. In this case, the contents confirmation response includes an encrypted random number (R2) d14, and a success message (C) d15.

When the comparison check of the seed value is unsuccessful, the transmitter A creates the message M4 based on a function J shown in the following expression (7), using all seeds (S1, S2, . . . , and Sn) currently being processed, the value R2 obtained by copying the random number R1 included in the contents confirmation request, and a constant (C2). As the encryption algorithm used for the function J, a well-known algorithm like the AES can be used.

$$M4=J(K,R2\|C2\|S1\|S2\| \ldots \|Sn) \quad (7)$$

where K denotes the authentication key, and the symbol of operation "∥" denotes a concatenation. The failure message C2 is the constant determined in advance between the transmitter A and the receiver B. The function I denotes the processing of encrypting the message in which R2 and C2 are concatenated, using the key K. Depending on the encryption algorithm, padding is necessary in addition to the message to be encrypted. In this case, a padding length field or a data length field of the data to be encrypted is defined in the header, and the encryption processing is carried out including the padding.

Figure 25:
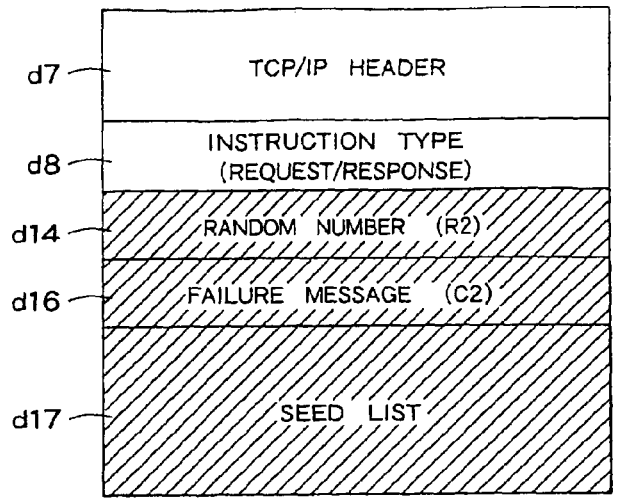
FIG. 25 is a diagram showing one example of a message format of the contents confirmation response when the seed check processing is unsuccessful.

The transmitter A transmits a response message including the message M4 to the receiver B. FIG. 25 is a diagram showing one example of a message format of the contents confirmation response when the seed check processing is unsuccessful. In this case, the contents confirmation response includes the encrypted random number (R2) d14, the failure message (C2) d16, and a seed list d17.

The receiver B decrypts the message M4 using the authentication key K (step S165), and checks whether the random number R2 included in the message M4 coincides with the value R1 transmitted at step S150 (steps S154 and S166). When the random number R2 does not coincide with the value R1, the receiver B returns an error message without carrying out the following processing (step S169). When the random number R2 coincides with the value R1, the receiver B checks whether the constant is a failure message or a success message (step S167). The order of the random number check processing and the constant check processing can be changed. When the constant is a success message (step S168), the receiver B continues the decryption processing. When the constant is a failure message, the receiver B compares the value of the seed S1 included in the message M4 with the value of the seed S1 obtained at step S140 (steps S170 to S174). Specifically, the receiver B checks whether the seed S1 is included within the range of the following expression (8) (step S171).

$$S1-Z \leq Sr \leq S1+Y \quad (8)$$

where Z denotes a positive integer larger than Y, and Y denotes 0.

What is important in this case is to increase the range of comparing the seed value to be larger than the range of the comparison check carried out by the transmitter A. As described in the first embodiment, there is a risk that the transmitter A is unsuccessful in the match test of the range due to a delay in the network or a buffer held by the device. At this point of time, the transmitter A transmits a contents confirmation response as the failure message C2. When this seed list is included in the contents confirmation response, the receiver B searches for the seed list by increasing the range of the comparison match test to be larger than the range of the comparison match test that the transmitter A carries out.

Therefore, it possible to determine whether the transmitter A is unsuccessful in the confirmation test due to a too small range of the comparison match test or the confirmation is completely unsuccessful. In other words, the receiver B can confirm whether the failure message C2 is transmitted because the search range of the transmitter A is too small or the failure message C2 is transmitted because of other reasons. When the range is too small, the comparison check test is an error, and the receiver B can make the contents confirmation request again. When the receiver is unsuccessful in the search processing despite the increased range, the receiver B can stop the contents confirmation processing.

When the receiver B receives the failure message C2, the receiver B does not necessarily carry out the search processing, and can determine that the search processing is unsuccessful by skipping this processing.

When it can be confirmed that the contents confirmation response includes the success message C, the receiver B determines that the confirmation processing is successful, and continues to decrypt the contents. When it can be confirmed that the contents confirmation response includes the failure message C2, the receiver B returns an error message. When the contents confirmation response includes the failure message C2, the processing to be carried out after the error processing can be changed, by determining whether the confirmation processing will be successful when the seed search range is enlarged.

As described above, according to the third embodiment, not only the receiver B, but also the transmitter A confirms the seed. Therefore, the processing load of the receiver B can be lightened. Even when the transmitter A cannot confirm the match of the seed, the receiver B checks the seed value again, and can identify a cause of mismatch of the seed value.

Fourth Embodiment

According to the third embodiment, the transmitter A encrypts the seed list and transmits the message M4 at the time of generating the contents confirmation response. On the other hand, according to a fourth embodiment, in order to verify the completeness of the contents confirmation response, a hash function is used. In this respect, the fourth embodiment is different from the third embodiment.

Differences between the fourth embodiment and the third embodiment are mainly explained below. The transmitter A and the receiver B carry out the whole contents confirmation processing similar to the processing sequence shown in FIG. 20.

Figure 26:
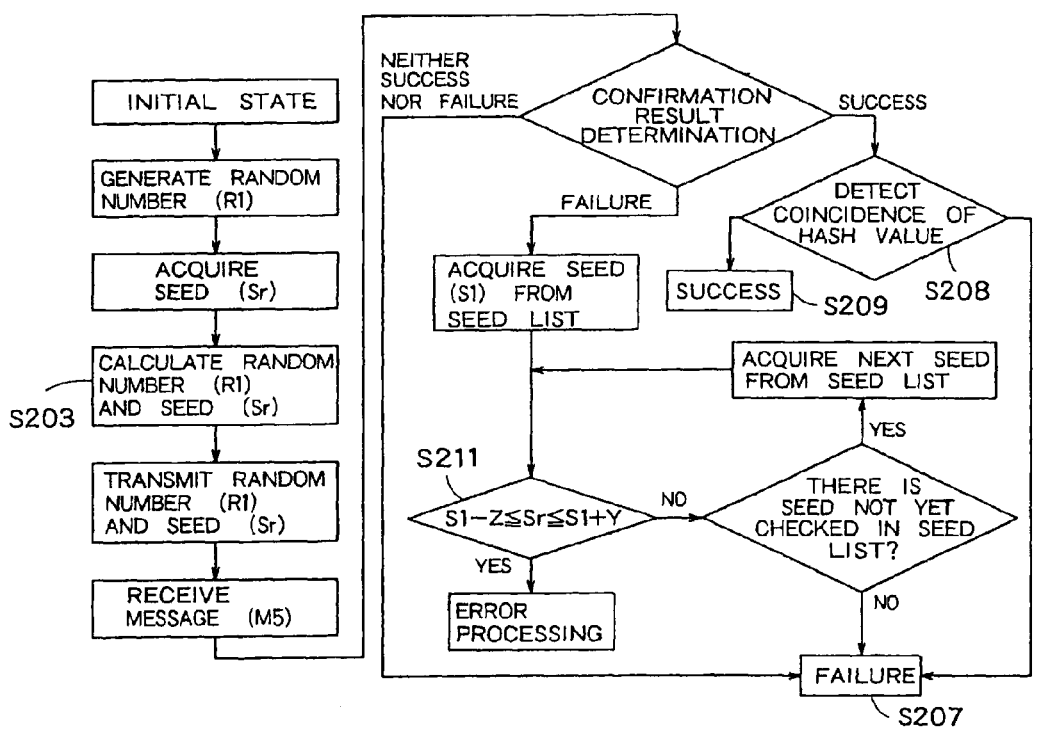
FIG. 26 is a flowchart showing one example of a processing procedure of a contents confirmation processing that the receiver B carries out.
Figure 27:
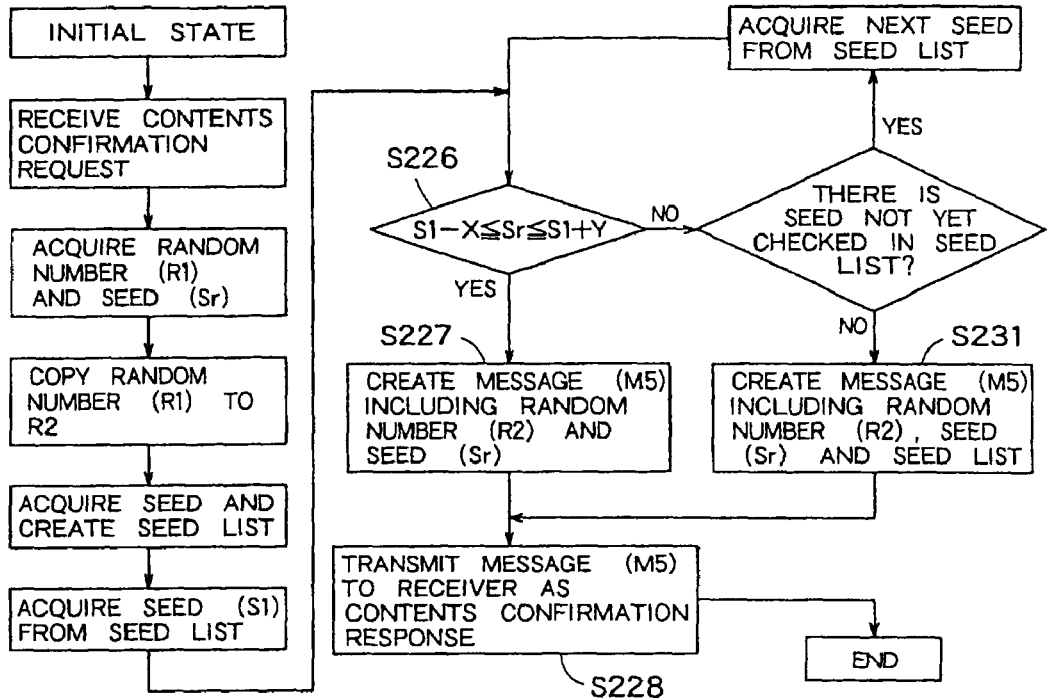
FIG. 27 is a flowchart showing one example of a processing procedure of a contents confirmation processing that the transmitter A carries out.

FIG. 26 is a flowchart showing one example of a processing procedure of a contents confirmation processing that the receiver B carries out. FIG. 27 is a flowchart showing one example of a processing procedure of a contents confirmation processing that the transmitter A carries out. The receiver B carries out the processing similar to that shown in FIG. 2 until when the receiver B transmits the random number R1 to the transmitter A. The processing is explained sequentially with reference to FIG. 26 and FIG. 27. The processing carried out by the transmitter A and the receiver B after the random number R1 is transmitted to the transmitter A is described below.

The transmitter A that receives the contents confirmation request checks whether the received seed (Sr) is included within the range of the following expression (9) out of all seeds (S1, S2, . . . , and Sn) currently being processed (step S226).

$$S1-X \leq Sr \leq S1+Y \quad (9)$$

where X denotes a positive integer value, and Y denotes 0.

When the comparison check is successful, the transmitter A obtains the random number R2 obtained by copying the random number R1 included in the contents confirmation request, and creates a message M5 using the following function H (step S227). A well-known unidirectional hash function shown in the expression (10), such as the SHA-1, can be used as the hash function for the function H.

$$M5=H(K\|R2\|Sr) \quad (10)$$

where K denotes an authentication key, and the symbol of operation "||" denotes a concatenation.

Figure 28:
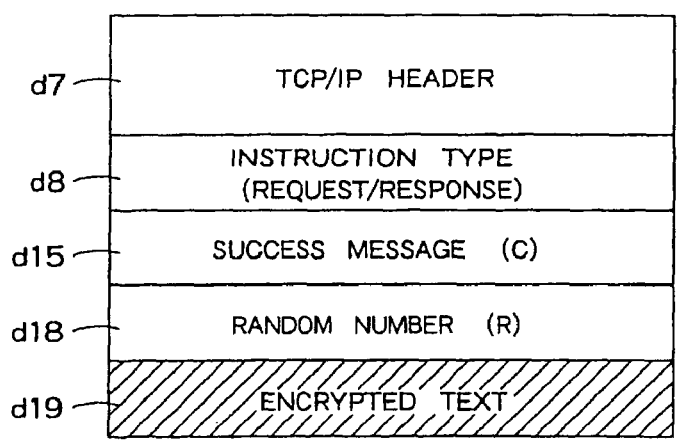
FIG. 28 is a diagram showing one example of a format of the contents confirmation response message.

The transmitter A transmits a contents confirmation response including the message (M5) to the receiver B. FIG. 28 is a diagram showing one example of a format of the contents confirmation response message. In FIG. 28, a success message (C) d15 denotes a constant determined in advance between the transmitter A and the receiver B, and an encrypted text d19 denotes M5. The random number (R) d18 is not always necessary, and can be omitted. The success message is transmitted in a plain text.

When the comparison check of the seed value is unsuccessful, the transmitter A creates the message (M5) based on a function H shown in the following expression (11), using the random number R1 and all seeds (S1, S2, . . . , and Sn) currently being processed (step S231). A well-known unidirectional hash function such as the SHA-1 can be used as the hash function for the function H.

$$M5=H(K\|R2\|S1.S2\| \ldots \|Sn) \quad (11)$$

where K denotes the authentication key, and the symbol of operation "||" denotes a concatenation.

The transmitter A transmits a response message including the message (M5) and a plain text seed list, to the receiver B (step S228). FIG. 29 is a diagram showing one example of a message format of the contents confirmation response. In FIG. 29, a failure message (C2) d20 is the constant determined in advance between the transmitter A and the receiver B. An encrypted text d22 denotes M5. A seed list d23 denotes (S1, S2, . . . , and Sn). The failure message C2, the random number d21, and the seed list d23 are used for the confirmation processing, and therefore, can be transmitted in a plain text.

The receiver B calculates a hash value based on the function H shown in the following expression (12) from the authentication key, the random number R1, and the seed (Sr) included in the header of the contents packet (step S203).

$$\text{hash}=H(K\|R1\|Sr) \quad (12)$$

where K denotes an authentication key, R1 denotes a random number transmitted in the contents confirmation request, and Sr denotes a seed value included in the header of the contents packet. The symbol of operation "||" denotes a concatenation.

Upon receiving the message (M5) in the contents confirmation response, the receiver B checks which one of the success message C and the failure message C2 is included in the message (M5).

When the success message C is included, the receiver B checks whether the encrypted text included in the message (M5) coincides with the hash value (hash) calculated in advance (step S208). When the match test of the hash value is successful (step S209), the receiver B determines that the contents confirmation processing is successful, and continues the contents decryption processing. When the match test of the hash value is unsuccessful, the receiver B determines that the contents confirmation response is unsuccessful, and returns an error message (step S207).

When the failure message C2 is included, the receiver B compares the value of the seed S1 included in the message (M5) with the value of the seed (Sr1) obtained at step (1) based on the following expression (13) (step S211).

$$S1-Z<Sr<S1+Y \quad (13)$$

where Z denotes a positive integer larger than Y, and Y denotes 0.

When the seed is included in the seed list, the receiver B determines that the confirmation test of the transmitter A is unsuccessful due to the timing of transmitting the contents confirmation response. In other cases, the receiver determines that the transmitter A is completely unsuccessful in the confirmation processing. When the range is too small, the contents confirmation request processing carried out this time is treated as an error, to make the contents confirmation request again. When the search is completely unsuccessful even if the seed range is enlarged, the receiver B determines that the search processing is unsuccessful.

In order to check whether an intermediate device changes the seed list, the receiver B can check whether the encrypted text included in the contents confirmation response coincides with the hash value shown in the expression (14) calculated by the receiver B.

$$\text{hash} = H(K\|R1\|S1\|S2\|\ldots\|Sn) \tag{14}$$

where K denotes the authentication key, R1 denotes a random number transmitted in the contents confirmation request, and S1, S2, and Sn denote values of the seed list included in the contents confirmation response. The symbol of operation "||" denotes a concatenation.

When the receiver B receives the failure message C2, the receiver B does not necessarily carry out the search processing, and can determine that the search processing is unsuccessful by skipping this processing.

When the contents confirmation response includes a success message and also when the hash value matches, the receiver B determines that the confirmation processing is successful, and continues to decrypt the contents. When it is confirmed that the contents confirmation response includes a failure message, the receiver B returns an error message. When the contents confirmation response includes a failure message, the receiver B can change the processing to be executed after the error processing, by determining whether the search is successful when the seed search range is enlarged.

As described above, according to the fourth embodiment, the receiver B can not only obtain a seed value confirmation result of the transmitter A but also determine a result of the contents confirmation response before calculating a hash value. Therefore, the efficiency of the processing can be improved. Furthermore, it is possible to prevent the intermediate device from illegally obtaining the contents.

In the above embodiments, the information processing apparatus can be in a hardware configuration or a software configuration. When the information processing apparatus is configured by software, a program for realizing at least a part of the functions of the information processing apparatus can be stored in a recording medium such as a floppy disk and a CD-ROM, and a computer can read and execute this program. The recording medium is not limited to a portable medium such as a magnetic disk and an optical disk, but can be a fixed recording medium such as a hard disk unit and a memory.

Furthermore, a program for realizing at least a part of the functions of the information processing apparatus can be distributed via a network (including radio communications) such as the Internet. The program can be distributed via a wireless network or wired network such as the Internet, and can be distributed by storing the program in a recording medium, in an encrypted, modulated, or compressed state.

What is claimed is:

1. An information processing apparatus configured to receive encrypted contents and key information attached to the contents transmitted from a communication apparatus connected via a network, the information apparatus comprising:

an authentication and key exchange unit configured to perform authentication and key exchange processing by using a given protocol with the communication apparatus and to generate a first key shared with the communication apparatus;

a contents receiver configured to receive the encrypted contents obtained by encrypting the contents with a second key, generated by using the first key and the key information, and to receive the key information attached to the encrypted contents, the key information being updated after transmission of a predetermined amount of contents;

a contents decryption unit configured to decrypt the encrypted contents by using the first key and the key information;

a contents confirmation request unit configured to transmit to the communication apparatus a contents confirmation request for transmitting or confirming the key information held by the communication apparatus when the contents decryption unit decrypts the contents based on the second key, the contents confirmation request including a first random number;

a key information confirmation unit configured to receive the key information or a confirmation result of the key information, the key information being encrypted by using the first key and the first random number, and being transmitted from the communication apparatus in response to the contents confirmation request to confirm whether or not a comparison between the received key information and the key information received by the contents receiver is successful;

a first communication connection to communicate the encrypted contents and the key information attached to the encrypted contents; and a second communication connection to communicate authentication and key exchange processing, and either of the encrypted key information or the encrypted confirmation result of the key information.

2. The information processing apparatus according to claim 1, further comprising a response confirmation unit configured to confirm whether or not a response to instruction by the contents confirmation request unit is valid by checking whether or not a first random number including in the instruction coincides with a second random number included in the response.

3. The information processing apparatus according to claim 2, further comprising a confirmation time measuring unit configured to measure a time period after the response confirmation unit begins confirmation processing until a confirmation result is obtained, wherein the response confirmation unit is configured to determine a failure of the confirmation processing and to end the confirmation processing when the time period measured by the confirmation time measuring unit is longer than a predetermined time period.

4. The information processing apparatus according to claim 2, further comprising:

a Hash operation unit configured to carry out a Hash operation by using the key information received by the contents receiver to calculate a Hash value when the response confirmation unit confirms coincidence of the key information; and a Hash comparator configured to compare the Hash value calculated by the Hash operation unit with the Hash value transmitted from the communication apparatus in response to instruction of the contents confirmation request unit.

5. The information processing apparatus according to claim 1, further comprising an after-confirmation operation unit configured to perform at least one of another instruction by the contents confirmation request unit and to prohibit decryption of the contents transmitted from the communication apparatus when the key information received by the contents receiver does not correspond to the key information held by the communication apparatus.

6. The information processing apparatus according to claim 1, further comprising:
- a contents confirmation response receiver configured to receive a contents confirmation response transmitted from the communication apparatus;
- a Hash acquisition unit configured to acquire a Hash value calculated by using a random number included in the contents confirmation response; and
- a random number checking unit configured to check whether or not the Hash value acquired by the Hash acquisition unit coincides with a Hash value calculated by using the random number transmitted to the communication apparatus.

7. An information processing apparatus configured to receive encrypted contents and key information attached to the contents transmitted from a communication apparatus connected via a network, the information processing apparatus comprising:
- an authentication and key exchange unit configured to perform authentication and key exchange processing by using a given protocol with the communication apparatus and to generate a first key shared with the communication apparatus;
- a contents receiver configured to receive the encrypted contents obtained by encrypting the contents with a second key, generated by using the first key and the key information, and to receive the key information attached to the encrypted contents, the key information being updated after transmission of a predetermined amount of contents;
- a contents decryption unit configured to decrypt the encrypted contents by using the first key and the key information;
- a contents confirmation request unit configured to transmit to the communication apparatus, after decryption of the encrypted contents, a contents confirmation request for transmitting or confirming key information held by the communication apparatus when the key information transmitted from the communication apparatus does not change in a sequence arranged with the communication apparatus in advance, the contents confirmation request including a first random number;
- a key information confirmation unit configured to receive the key information or a confirmation result of the key information, the key information being encrypted by using the first key and the first random number, and being transmitted from the communication apparatus in response to the contents confirmation request to confirm whether or not a comparison between the received key information and the key information received by the contents receiver is successful;
- a first communication connection to communicate the encrypted contents and the key information attached to the encrypted contents; and
- a second communication connection to communicate authentication and key exchange processing, and either of the encrypted key information or the encrypted confirmation result of the key information.

8. The information processing apparatus according to claim 7, further comprising a response confirmation unit configured to confirm whether or not a response to instruction by the contents confirmation request unit is valid by checking whether or not a first random number including in the instruction coincides with a second random number included in the response.

9. The information processing apparatus according to claim 8, further comprising a confirmation time measuring unit configured to measure a time period after the response confirmation unit begins confirmation processing until a confirmation result is obtained,
wherein the response confirmation unit is configured to determine a failure of the confirmation processing and to end the confirmation processing when the time period measured by the confirmation time measuring unit is longer than a predetermined time period.

10. The information processing apparatus according to claim 8, further comprising:
- a Hash operation unit configured to carry out a Hash operation by using the key information received by the contents receiver to calculate a Hash value when the response confirmation unit confirms coincidence of the key information; and
- a Hash comparator configured to compare the Hash value calculated by the Hash operation unit with the Hash value transmitted from the communication apparatus in response to instruction of the contents confirmation request unit.

11. The information processing apparatus according to claim 7, further comprising an after-confirmation operation unit configured to perform at least one of another instruction by the contents confirmation request unit and to prohibit decryption of the contents transmitted from the communication apparatus when the key information received by the contents receiver does not correspond to the key information held by the communication apparatus.

12. The information processing apparatus according to claim 7, further comprising:
- a contents confirmation response receiver configured to receive a contents confirmation response transmitted from the communication apparatus;
- a Hash acquisition unit configured to acquire a Hash value calculated by using a random number included in the contents confirmation response; and
- a random number checking unit configured to check whether or not the Hash value acquired by the Hash acquisition unit coincides with a Hash value calculated by using the random number transmitted to the communication apparatus.

13. An information processing apparatus configured to receive encrypted contents and key information attached to the contents transmitted from a communication apparatus connected via a network, the information processing apparatus comprising:
- an authentication and key exchange unit configured to perform authentication and key exchange processing by using a given protocol with the communication apparatus and to generate a first key shared with the communication apparatus;
- a contents receiver configured to receive the encrypted contents obtained by encrypting the contents with a second key generated by using the first key and the key information, and to receive the key information attached to the encrypted contents, the key information being updated after transmission of a predetermined amount of contents;
- a contents decryption unit configured to decrypt the encrypted contents by using the first key and the key information;
- a contents confirmation request unit configured to transmit to the communication apparatus, after decryption of the encrypted contents, a contents confirmation request for transmitting or confirming the key information held by the communication apparatus when the key information is updated at a timing different from a timing predicted in advance, the contents confirmation request including a first random number;

a key information confirmation unit configured to receive the key information or a confirmation result of the key information, the key information being encrypted by using the first key and the first random number, and being transmitted from the communication apparatus in response to the contents confirmation request to confirm whether or not a comparison between the received key information and the key information received by the contents receiver is successful;

a first communication connection to communicate the encrypted contents and the key information attached to the encrypted contents; and a second communication connection to communicate authentication and key exchange processing, and either of the encrypted key information or the encrypted confirmation result of the key information.

14. The information processing apparatus according to claim 13, further comprising a response confirmation unit configured to confirm whether or not a response to instruction by the contents confirmation request unit is valid by checking whether or not a first random number including in the instruction coincides with a second random number included in the response.

15. The information processing apparatus according to claim 14, further comprising a confirmation time measuring unit configured to measure a time period after the response confirmation unit begins confirmation processing until a confirmation result is obtained, wherein the response confirmation unit is configured to determine a failure of the confirmation processing and to end the confirmation processing when the time period measured by the confirmation time measuring unit is longer than a predetermined time period.

16. The information processing apparatus according to claim 14, further comprising:

a Hash operation unit configured to carry out a Hash operation by using the key information received by the contents receiver to calculate a Hash value when the response confirmation unit confirms coincidence of the key information; and a Hash comparator configured to compare the Hash value calculated by the Hash operation unit with the Hash value transmitted from the communication apparatus in response to instruction of the contents confirmation request unit.

17. The information processing apparatus according to claim 13, further comprising an after-confirmation operation unit configured to perform at least one of another instruction by the contents confirmation request unit and to prohibit decryption of the contents transmitted by the communication apparatus when the key information received by the contents receiver does not correspond to the key information held by the communication apparatus.

18. The information processing apparatus according to claim 13, further comprising:

a contents confirmation response receiver configured to receive a contents confirmation response transmitted from the communication apparatus;

a Hash acquisition unit configured to acquire a Hash value calculated by using a random number included in the contents confirmation response; and a random number checking unit configured to check whether or not the Hash value acquired by the Hash acquisition unit coincides with a Hash value calculated by using the random number transmitted to the communication apparatus.

19. An information processing apparatus configured to receive encrypted contents and key information attached to the contents transmitted from a communication apparatus connected via a network, the information processing apparatus comprising:

an authentication and key exchange unit configured to perform authentication and key exchange processing by using a given protocol with the communication apparatus and to generate a first key shared with the communication apparatus;

a contents receiver configured to receive the encrypted contents obtained by encrypting the contents with a second key generated by using the first key and the key information, and to receive the key information attached to the encrypted contents, the key information being updated after transmission of a predetermined amount of contents;

a contents decryption unit configured to decrypt the encrypted contents by using the first key and the key information;

a contents confirmation request unit configured to transmit to the communication apparatus, after decryption of the encrypted contents, a contents confirmation request for transmitting or confirming the key information held by the communication apparatus when a connection for contents transmission with the communication apparatus is once cut off and the connection with the communication apparatus is again established to begin the contents transmission, the contents confirmation request including a first random number;

a key information confirmation unit configured to receive the key information or a confirmation result of the key information, the key information being encrypted by using the first key and the first random number, and being transmitted from the communication apparatus in response to the contents confirmation request to confirm whether or not a comparison between the received key information and the key information received by the contents receiver is successful;

a first communication connection to communicate the encrypted contents and the key information attached to the encrypted contents; and a second communication connection to communicate authentication and key exchange processing, and either of the encrypted key information or the encrypted confirmation result of the key information.

20. The information processing apparatus according to claim 19, further comprising a response confirmation unit configured to confirm whether or not a response to instruction by the contents confirmation request unit is valid by checking whether or not a first random number including in the instruction coincides with a second random number included in the response.

21. The information processing apparatus according to claim 20, further comprising a confirmation time measuring unit configured to measure a time period after the response confirmation unit begins confirmation processing until a confirmation result is obtained, wherein the response confirmation unit is configured to determine a failure of the confirmation processing and to end the confirmation processing when the time period measured by the confirmation time measuring unit is longer than a predetermined time period.

22. The information processing apparatus according to claim 20, further comprising:
- a Hash operation unit configured to carry out a Hash operation by using the key information received by the contents receiver to calculate a Hash value when the response confirmation unit confirms coincidence of the key information; and
- a Hash comparator configured to compare the Hash value calculated by the Hash operation unit with the Hash value transmitted from the communication apparatus in response to instruction of the contents confirmation request unit.

23. The information processing apparatus according to claim 19, further comprising an after-confirmation operation unit configured to perform at least one of another instruction by the contents confirmation request unit and to prohibit decryption of the contents transmitted from the communication apparatus, when the key information received by the contents receiver does not correspond to the key information held by the communication apparatus.

24. The information processing apparatus according to claim 19, further comprising:
- a contents confirmation response receiver configured to receive a contents confirmation response transmitted from the communication apparatus;
- a Hash acquisition unit configured to acquire a Hash value calculated by using a random number included in the contents confirmation response; and
- a random number checking unit configured to check whether or not the Hash value acquired by the Hash acquisition unit coincides with a Hash value calculated by using the random number transmitted to the communication apparatus.

25. An information processing apparatus configured to transmit encrypted contents to a communication apparatus connected via a network, the information processing apparatus comprising:
- an authentication and key exchange unit configured to perform authentication and key exchange processing by using a given protocol with the communication apparatus;
- a key generation unit configured to operate a given function by using key information including a random number and a first key to generate a second key;
- an encryption unit configured to encrypt contents by using the second key;
- a contents transmitter configured to transmit the encrypted contents with the key information in plain text to the communication apparatus;
- a key information updating unit configured to update the key information based on a given condition, the key information being updated after transmission of a predetermined amount of contents;
- a random number acquisition unit configured to acquire the random number included in a contents confirmation request transmitted from the communication apparatus after the communication apparatus has received and decrypted the encrypted contents;
- a key information acquisition unit configured to acquire the key information being currently used to encrypt the contents from the communication apparatus;
- a contents confirmation response unit configured to transmit a message obtained by encrypting using the first key, the message including the key information acquired by the key information acquisition unit and the random number acquired by the random number acquisition unit, to the communication apparatus as a contents confirmation response to the contents confirmation request;
- a first communication connection to communicate the encrypted contents and the key information attached to the encrypted contents; and
- a second communication connection to communicate authentication and key exchange processing, and either of the encrypted key information or the encrypted confirmation result of the key information.

26. The information processing apparatus according to claim 25, further comprising:
- a search unit configured to search whether the key information included in the contents confirmation request is included in the key information acquired by the key information acquisition unit when the contents confirmation request is received from the communication apparatus; and
- a contents confirmation response unit configured to notify the information processing apparatus of a search result by the search unit.

27. The information processing apparatus according to claim 26,
wherein the search unit is configured to decide that the search is successful when the key information included in the contents confirmation request exists within a given range including the key information acquired by the key information acquisition unit.

28. The information processing apparatus according to claim 26, further comprising a Hash operation unit configured to carry out a Hash operation by using the random number acquired by the random number acquisition unit, the first key and the key information included in the contents confirmation request,
wherein the contents confirmation response unit transmits the contents confirmation response including the Hash value calculated by the Hash operation unit to the communication apparatus when the search unit is successful for the search.

29. The information processing apparatus according to claim 26, further comprising a Hash operation unit configured to carry out a Hash operation by using the random number acquired by the random number acquisition unit, the first key and the key information acquired by the key information acquisition unit,
wherein the contents confirmation response unit transmits the contents confirmation response including the Hash value calculated by the Hash operation unit and the key information acquired by the key information acquisition unit to the communication apparatus.

30. An information processing method of transmitting encrypted contents via a network from a transmitter to a receiver, the information processing method comprising:
performing authentication and key exchange processing via a first communication connection by using a given protocol between the transmitter and the receiver to generate a first key shared between the transmitter and the receiver, wherein
the transmitter encrypts the contents based on a second key generated by a given function by using key information including a generated random number and the first key, and transmits the encrypted contents via a second communication connection with the key information in plain text, to the receiver, the key information being updated after transmission of a predetermined amount of contents;

the receiver receives the encrypted contents and the key information to decrypt the encrypted contents by using the key information;

the transmitter updates the key information based on a given condition;

the receiver transmits the contents confirmation request, after receiving and decrypting the encrypted contents, for confirmation of the key information held by the transmitter via the first communication connection to the transmitter at a given timing;

the transmitter acquires the random number included in the contents confirmation request and the key information being currently used, when the contents confirmation request is received;

the transmitter transmits to the receiver information obtained by encrypting using the first key, the information including at least one of a confirmation result showing whether the acquired key information coincides with the key information held by the receiver and the acquired key information with the acquired random number, as a contents confirmation response to the contents confirmation request; and the receiver performs at least one of another instruction by the contents confirmation request unit and prohibition of decryption of the contents transmitted from the communication apparatus when the key information added to the encrypted contents does not coincide with the key information being currently used by the transmitter.

31. An information processing apparatus configured to receive encrypted contents and key information attached to the contents transmitted from a communication apparatus connected via a network, the information apparatus comprising:

an authentication and key exchange unit configured to perform authentication and key exchange processing by using a given protocol with the communication apparatus and to generate a first key shared with the communication apparatus;

a contents receiver configured to receive the encrypted contents obtained by encrypting the contents with a second key, generated by using the first key and the key information, and to receive the key information attached to the encrypted contents, the key information being updated after transmission of a predetermined amount of contents;

a contents decryption unit configured to decrypt the encrypted contents by using the first key and the key information;

a contents confirmation request unit configured to transmit to the communication apparatus a contents confirmation request for transmitting or confirming the key information held by the communication apparatus when the contents decryption unit decrypts the contents based on the second key firstly generated by using the first key, the contents confirmation request including a first random number;

a key information confirmation unit configured to receive the key information or a confirmation result of the key information, the key information being encrypted by using the first key and the first random number, and being transmitted from the communication apparatus in response to the contents confirmation request to confirm whether or not a comparison between the received key information and the key information received by the contents receiver is successful;

a first communication connection to communicate the encrypted contents and the key information attached to the encrypted contents; and a second communication connection to communicate authentication and key exchange processing, and either of the encrypted key information or the encrypted confirmation result of the key information.

* * * * *